US012577989B2

(12) United States Patent
Kano et al.

(10) Patent No.: US 12,577,989 B2
(45) Date of Patent: Mar. 17, 2026

(54) CLUTCH CONTROL APPARATUS

(71) Applicant: HONDA MOTOR CO., LTD., Minato-ku (JP)

(72) Inventors: Junichiro Kano, Tokyo (JP); Junya Ono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 18/280,958

(22) PCT Filed: Mar. 10, 2022

(86) PCT No.: PCT/JP2022/010611
§ 371 (c)(1),
(2) Date: Mar. 5, 2024

(87) PCT Pub. No.: WO2022/209708
PCT Pub. Date: Oct. 6, 2022

(65) Prior Publication Data
US 2025/0327493 A1    Oct. 23, 2025

(30) Foreign Application Priority Data

Mar. 31, 2021    (JP) ................................. 2021-060133

(51) Int. Cl.
F16D 23/12        (2006.01)
F16D 125/44        (2012.01)
F16D 131/00        (2012.01)

(52) U.S. Cl.
CPC .......... F16D 23/12 (2013.01); F16D 2125/44 (2013.01); F16D 2131/00 (2013.01)

(58) Field of Classification Search
CPC .... F16D 13/52; F16D 23/12; F16D 2023/123; F16D 2023/126
See application file for complete search history.

(56) References Cited

U.S. PATENT DOCUMENTS

2006/0191766 A1* 8/2006 Konukiyo ............. F16D 25/082
                                                            192/85.22
2007/0144862 A1* 6/2007 Koyama ................. F16D 13/56
                                                            192/93 A (Continued)

FOREIGN PATENT DOCUMENTS

JP          60-129522        8/1985
JP          2001-012504      1/2001

(Continued)

OTHER PUBLICATIONS

International Search Report and Written Opinion for International Application Serial No. PCT/JP2022/010611 mailed on Apr. 26, 2022, 12 pages.

*Primary Examiner* — Stacey A Fluhart
(74) *Attorney, Agent, or Firm* — Amin, Turocy & Watson, LLP

(57)                ABSTRACT

This clutch control apparatus includes a clutch apparatus, a clutch actuator, and a release mechanism, wherein the release mechanism includes a release shaft that transmits a drive force of the clutch actuator to the clutch apparatus side, the release shaft is divided into: a clutch-side shaft that is supported by a clutch-side member as a separate body from the clutch actuator; and a control-side shaft that is supported by the clutch actuator and is attachable to and detachable from the clutch-side shaft, and the clutch actuator configures an integral actuator unit that includes the control-side shaft.

7 Claims, 18 Drawing Sheets

(56)                 References Cited

U.S. PATENT DOCUMENTS

| | | | |
|---|---|---|---|
| 2009/0127057 A1* | 5/2009 | Inomori .................. | F16D 25/02 |
| | | | 192/70.18 |
| 2010/0181137 A1* | 7/2010 | Ishida ..................... | F16D 13/56 |
| | | | 180/293 |
| 2015/0001028 A1* | 1/2015 | Yoshimoto ............. | F16D 13/56 |
| | | | 192/70.23 |

FOREIGN PATENT DOCUMENTS

| | | |
|---|---|---|
| JP | 2005-030498 | 2/2005 |
| JP | 5004915 | 8/2012 |

* cited by examiner

Figure 3:
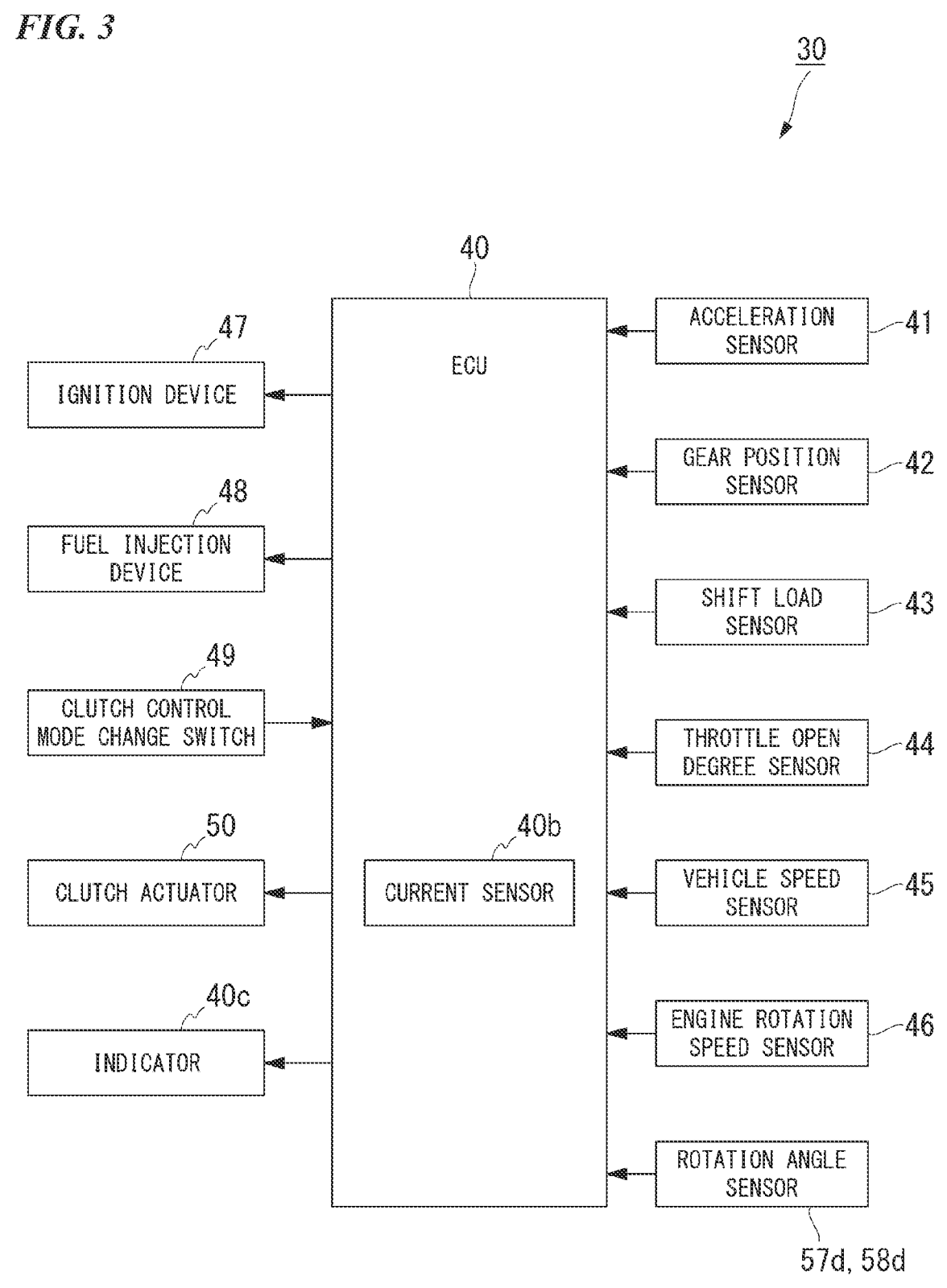

ECU

| Left side | ECU | Right side |
|---|---|---|

47 IGNITION DEVICE

48 FUEL INJECTION DEVICE

49 CLUTCH CONTROL MODE CHANGE SWITCH

50 CLUTCH ACTUATOR

40b CURRENT SENSOR

40c INDICATOR

41 ACCELERATION SENSOR

42 GEAR POSITION SENSOR

43 SHIFT LOAD SENSOR

44 THROTTLE OPEN DEGREE SENSOR

45 VEHICLE SPEED SENSOR

46 ENGINE ROTATION SPEED SENSOR

ROTATION ANGLE SENSOR 57d, 58d

150

51

55a

54

58b

57a

57b

C1

63a

58a

38

C2

53

C3

CLUTCH CONTROL APPARATUS

TECHNICAL FIELD

The present invention relates to a clutch control apparatus.

Priority is claimed on Japanese Patent Application No. 2021-060133, filed on Mar. 31, 2021, the contents of which are incorporated herein by reference.

BACKGROUND

In recent saddle riding vehicles, an automatic clutch system has been proposed in which the connection-disconnection operation of a clutch apparatus is automatically performed by electric control (for example, refer to Patent Document 1).

RELATED ART DOCUMENTS

Patent Documents

Patent Document 1

Japanese Patent No. 5004915

SUMMARY OF INVENTION

Problems to be Solved by the Invention

The related art described above discloses a configuration in which hydraulic pressure is supplied from a hydraulic actuator to a slave cylinder, and the clutch apparatus is disconnected.

On the other hand, a configuration is considered in which the connection and disconnection of the clutch apparatus are performed directly by an electric motor without using hydraulic pressure.

However, in order to operate the clutch apparatus without using hydraulic pressure, it is necessary to arrange the clutch actuator including a drive source in the vicinity of the clutch apparatus. Therefore, it is desired to efficiently arrange the clutch actuator in the vicinity of the clutch apparatus.

In view of the foregoing, the present invention aims to, in a clutch control apparatus that controls the connection and disconnection of a clutch apparatus, efficiently arrange a clutch actuator in the vicinity of the clutch apparatus.

Means for Solving the Problem

As a means for solving the problem described above, an aspect of the present invention includes: a clutch apparatus (26) that connects and disconnects a power transmission between a motor (13) and an output target (21); a clutch actuator (50) that outputs a drive force for operating the clutch apparatus (26); and a release mechanism (38) that receives a drive force of the clutch actuator (50) and operates the clutch apparatus (26), wherein the release mechanism (38) includes a release shaft (53) that transmits the drive force of the clutch actuator (50) to the clutch apparatus (26) side, the release shaft (53) is divided into: a clutch-side shaft (62) that is supported by a clutch-side member (17a) as a separate body from the clutch actuator (50); and a control-side shaft (63) that is supported by the clutch actuator (50) and is attachable to and detachable from the clutch-side shaft (62), and the clutch actuator (50) configures an integral actuator unit (50A) that includes the control-side shaft (63).

According to this configuration, the clutch actuator configures the integral actuator unit that includes the control-side shaft. Therefore, the actuator unit can be attached afterward and be efficiently arranged in the vicinity of the clutch apparatus.

In the aspect described above, the clutch-side member (17a) may be a cover member (17a) that covers the clutch apparatus (26), and a recess portion (17c) to which the actuator unit (50A) is attachable in a state where the actuator unit (50A) enters the recess portion (17c) may be formed on the cover member (17a).

According to this configuration, the recess portion to which the actuator unit is attached is formed on the cover member that covers the clutch apparatus. Therefore, the actuator unit can be compactly arranged. Further, the actuator unit can be arranged as close as possible to the clutch apparatus.

The aspect described above may include: a control portion (40) that drives and controls the clutch actuator (50), wherein the control portion (40) may enable intervention of a manual operation by a clutch operator in automatic control of the clutch apparatus (26) by a drive of the clutch actuator (50) and shift to a predetermined manual operation intervention control when there is intervention of the manual operation, the release shaft (53) may be divided into: an operation-side shaft (61) to which a driven component (54) that interlocks with the clutch operator is attached; the control-side shaft (63); and the clutch-side shaft (62), and the clutch actuator (50) may configure the actuator unit (50A) that includes the operation-side shaft (61) and the control-side shaft (63).

According to this configuration, in a system in which intervention of a manual operation is possible, the clutch actuator configures an integral actuator unit that includes the operation-side shaft and the control-side shaft. Therefore, the actuator unit can be attached afterward and be efficiently arranged in the vicinity of the clutch apparatus. In the aspect described above, the clutch control apparatus may be applied to a saddle riding vehicle (1), wherein when the actuator unit (50A) is mounted on a vehicle, a transmission mechanism (51) of the clutch actuator (50) and a drive source (52) may be arranged at a forward position of the driven component (54).

According to this configuration, the transmission mechanism and the drive source, which are bulky, are arranged at a forward position of the driven component. Therefore, it is possible to reduce the impact on a space (a space where the driver's legs in the saddle riding vehicle are located) at the rearward side of the driven component.

In the aspect described above, the control-side shaft (63) may be arranged to be spaced in an axis direction from the operation-side shaft (61) and the clutch-side shaft (62).

According to this configuration, the friction of the control-side shaft can be reduced as much as possible, and the accuracy of the clutch control can be improved.

In the aspect described above, the transmission mechanism (51) of the clutch actuator (50) may include a fan gear (58a, 63a) having a portion that is cut out in a circumferential direction.

According to this configuration, it is possible to reduce the size and the weight of the transmission mechanism compared to the case where the fan gear is a circular gear.

In the aspect described above, the transmission mechanism (51) of the clutch actuator (50) may be a speed reduction mechanism (51) that decelerates a drive force of a drive source (52) in a step-by-step manner and transmits the drive force to the control-side shaft (63), and the speed reduction mechanism (51) may include: a driven gear (63*a*) that rotates integrally with the control-side shaft (63); and a stopper (59*a*) that defines a rotation reference position of a gear closer to the drive source (52) than the driven gear (63*a*) in a deceleration path.

According to this configuration, the stopper that defines the rotation reference position for the gear on the further upstream side (drive source side) than the driven gear that is most decelerated is provided. Therefore, it is possible to reduce a load input to the stopper compared to the case where the stopper is provided on the driven gear at the final stage. Further, it is possible to prevent an excess load input to the final stage in which the torque is the largest due to deceleration, and the size and the weight of the gear can be reduced.

Advantage of the Invention

According to the present invention, in a clutch control apparatus that controls the connection and disconnection of a clutch apparatus, it is possible to efficiently arrange a clutch actuator in the vicinity of the clutch apparatus.

BRIEF DESCRIPTION OF THE DRAWINGS

FIG. 3 is a block diagram of a transmission system of the motorcycle described above.

DESCRIPTION OF THE EMBODIMENTS

Figure 1:
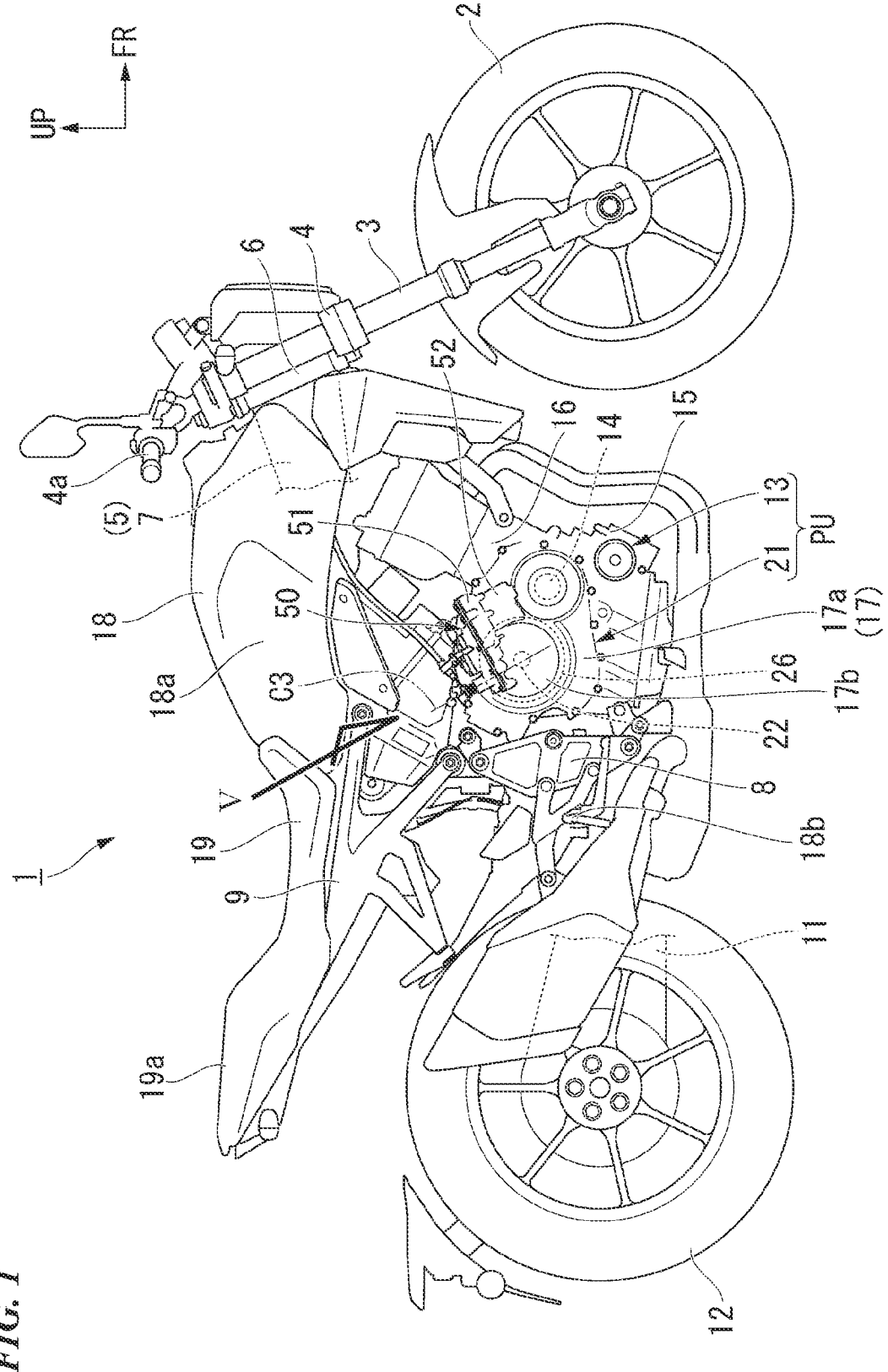
FIG. 1 is a right side view of a motorcycle of the present embodiment.

Hereinafter, an embodiment of the present invention will be described with reference to the drawings. Directions such as forward, rearward, rightward, and leftward directions in the following description are the same as directions in a vehicle described below unless otherwise specified. Further, in appropriate positions in the drawings used in the following description, an arrow FR that indicates a vehicle forward direction, an arrow LH that indicates a vehicle leftward direction, and an arrow UP that indicates a vehicle upward direction are shown.

Entire Vehicle

As shown in FIG. 1, the present embodiment is applied to a motorcycle 1 as an example of a saddle riding vehicle. A front wheel 2 of the motorcycle 1 is supported by lower end portions of a pair of right and left front forks 3. Upper portions of the right and left front forks 3 are supported by a head pipe 6 at a front end portion of a vehicle body frame 5 via a steering stem 4. A bar-type steering handle 4*a* is attached onto a top bridge of the steering stem 4.

The vehicle body frame 5 includes: a head pipe 6; a main frame 7 that extends downward and rearward from the head pipe 6 at the middle in a vehicle width direction (rightward-leftward direction): a pivot frame 8 that is provided below a rear end portion of the main frame 7; and a seat frame 9 that continues to and at a rearward position of the main frame 7 and the pivot frame 8. A front end portion of the swing arm 11 is pivotally supported swingably by the pivot frame 8. A rear wheel 12 of the motorcycle 1 is supported by a rear end portion of the swing arm 11.

A fuel tank 18 is supported above the right and left main frames 7. A front seat 19 and a rear seat 19*a* are supported at a rearward position of the fuel tank 18 and above the seat frame 9. A knee grip portion 18*a* that is recessed inward in the vehicle width direction is formed on both right and left sides of a rear portion of the fuel tank 18. The right and left knee grip portions 18*a* are formed to match the following portion. The portion is the inside around the right and left knees of a driver seated on the front seat 19. A step 18*b* is supported on both right and left sides below the front seat 19. The driver places the foot portion at the front from the ankle on the step 18*b*.

A power unit PU that includes a motor of the motorcycle 1 is suspended below the main frame 7. The power unit PU integrally includes an engine (an internal combustion engine, a motor) 13 that is located at a forward side of the power unit PU and a transmission 21 that is located at a rearward side. The engine 13 is, for example, a multicylinder engine in which a rotation axis of a crankshaft 14 is along a rightward-leftward direction (vehicle width direction).

In the engine 13, the cylinder 16 stands above a front portion of a crankcase 15. A rear portion of the crankcase 15 is defined as a transmission case 17 that accommodates the transmission 21. A right cover 17a that extends over a right side portion of the transmission case 17 is attached to a right side portion of the crankcase 15. The right cover 17a is also a clutch cover that covers a clutch apparatus 26. The power unit PU is interlocked with the rear wheel 12, for example, via a chain-type transmission mechanism (not shown).

Transmission

Figure 2:
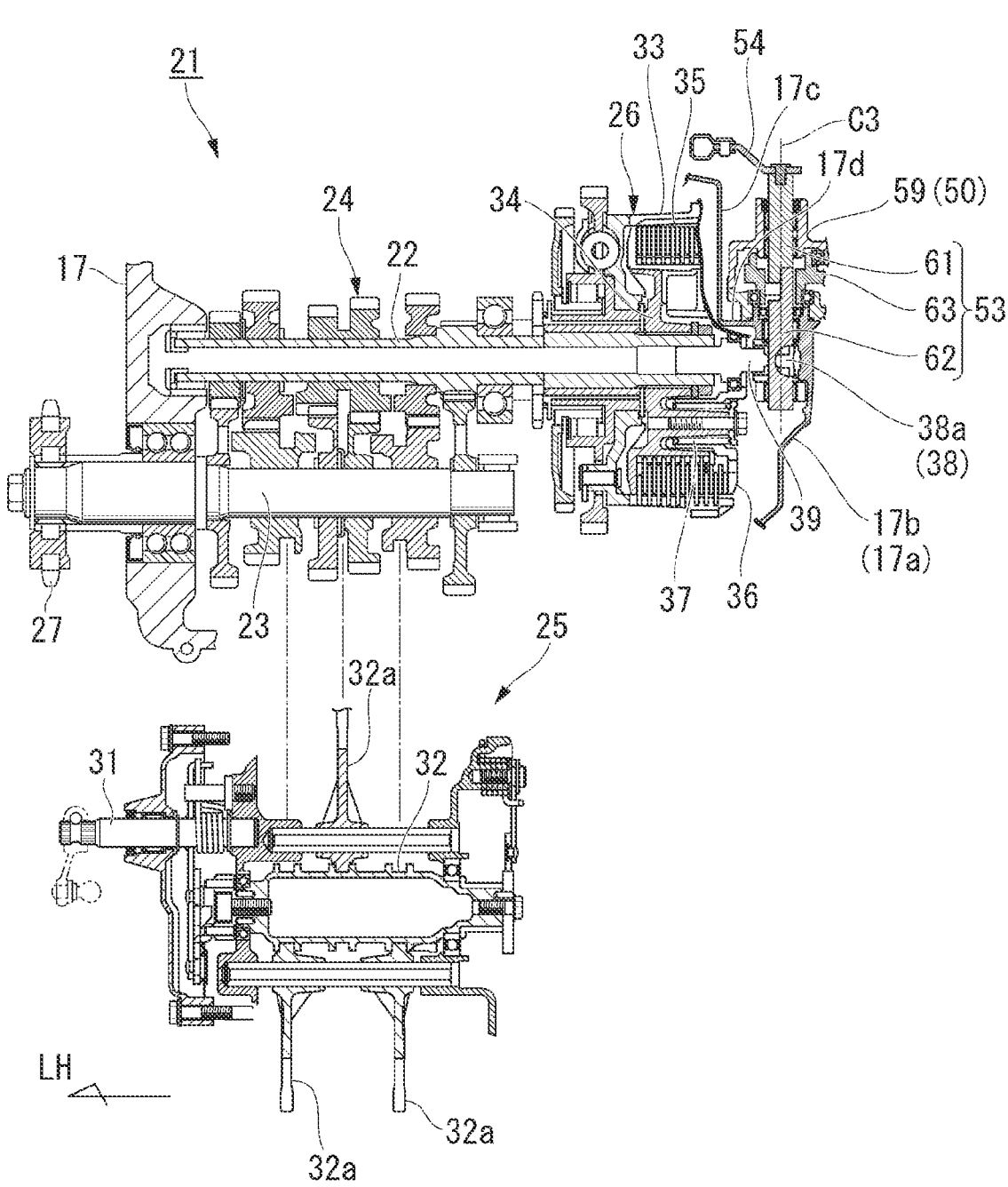
FIG. 2 is a cross-sectional view of a transmission and a change mechanism of the motorcycle described above.

With reference also to FIG. 2, the transmission 21 is a step-type transmission. The transmission 21 has a main shaft 22, a counter shaft 23, and a transmission gear group 24 that spans both shafts 22 and 23. The counter shaft 23 constitutes an output shaft of the transmission 21 and thus the power unit PU. A left end portion of the counter shaft 23 protrudes leftward at a rear portion of the transmission case 17 and is connected to the rear wheel 12 via the chain-type transmission mechanism.

The main shaft 22 and the counter shaft 23 of the transmission 21 are arranged at a rearward position of the crankshaft 14. The clutch apparatus 26 is arranged coaxially on a right end portion of the main shaft 22. The clutch apparatus 26 connects and disconnects a power transmission between the crankshaft 14 of the engine 13 and the main shaft 22 of the transmission 21. The clutch apparatus 26 performs the connection-disconnection operation according to at least one of an operation of a clutch operator (for example, a clutch lever (not shown)) by an occupant and an operation of a clutch actuator 50 described later in detail.

The clutch apparatus 26 is, for example, a wet multi-plate clutch and is a so-called normally closed clutch. The rotation power of the crankshaft 14 is transmitted through the clutch apparatus 26 to the main shaft 22 and is transmitted from the main shaft 22 to the counter shaft 23 through an arbitrary gear pair of the transmission gear group 24. A drive sprocket 27 of the chain-type transmission mechanism is attached to a left end portion that protrudes leftward at a rear portion of the crankcase 15 in the counter shaft 23.

A change mechanism 25 that switches the gear pair of the transmission gear group 24 is accommodated in the vicinity of the transmission 21 within the transmission case 17. The change mechanism 25 includes a shift drum 32 having a hollow cylindrical shape and in parallel with both shafts 22, 23. By the rotation of the shift drum 32, the change mechanism 25 operates a plurality of shift forks 32a. This operation is performed in accordance with the pattern of a lead groove formed on an outer circumference of the shift drum 32. By this operation, the change mechanism 25 switches the gear pair used for power transmission between the shafts 22, 23 in the transmission gear group 24.

Here, in the motorcycle 1, the driver performs only the speed change operation (foot operation of a shift pedal (not shown)) of the transmission 21, and the connection-disconnection operation of the clutch apparatus 26 is performed automatically by electric control in accordance with the operation of the shift pedal. That is, the motorcycle 1 employs a so-called semi-automatic transmission system (automatic clutch transmission system).

Transmission System

As shown in FIG. 3, the transmission system 30 includes the clutch actuator 50, an ECU 40 (Electronic Control Unit, a control portion), a variety of sensors 41 to 46, 57d, 58d, and a variety of devices 47, 48, 50.

The ECU 40 operates and controls an ignition device 47 and a fuel injection device 48 and operates and controls the clutch actuator 50. This control is performed based on detection information from an acceleration sensor 41, a gear position sensor 42, and a shift load sensor 43 (for example, a torque sensor), and a variety of vehicle state detection information or the like from a throttle open degree sensor 44, a vehicle speed sensor 45, and an engine rotation speed sensor 46, and the like.

The acceleration sensor 41 detects the behavior of a vehicle body. The gear position sensor 42 detects a gear stage from the rotation angle of the shift drum 32. The shift load sensor 43 detects an operation torque input to a shift spindle 31 (refer to FIG. 2) of the change mechanism 25. The throttle open degree sensor 44 detects a throttle open degree. The vehicle speed sensor 45 detects a vehicle speed. The engine rotation speed sensor 46 detects an engine rotation speed.

Figure 5:
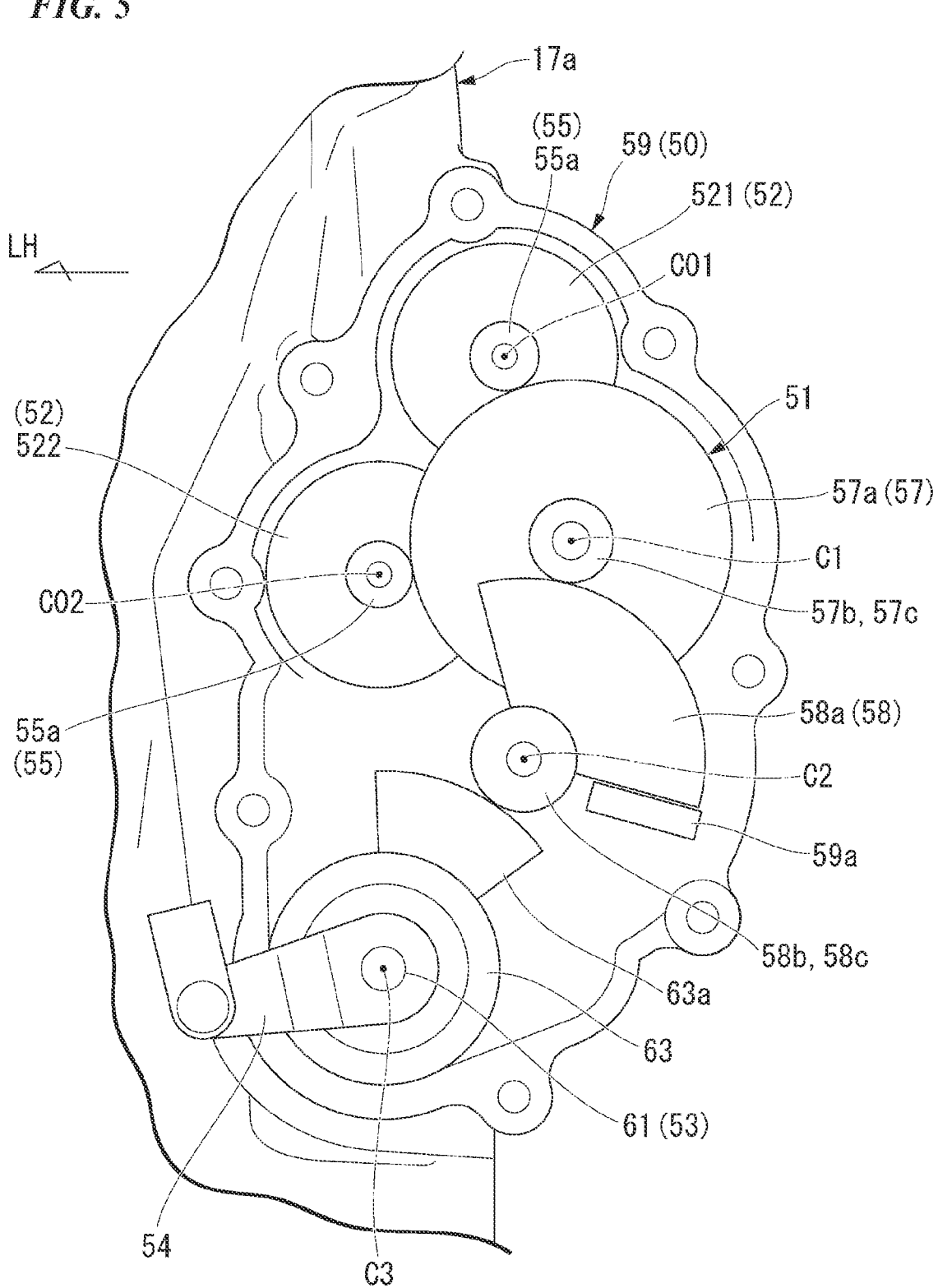
FIG. 5 is a view seen in an arrow V direction of FIG. 1 and showing an axis direction view of a clutch actuator.
Figure 6:
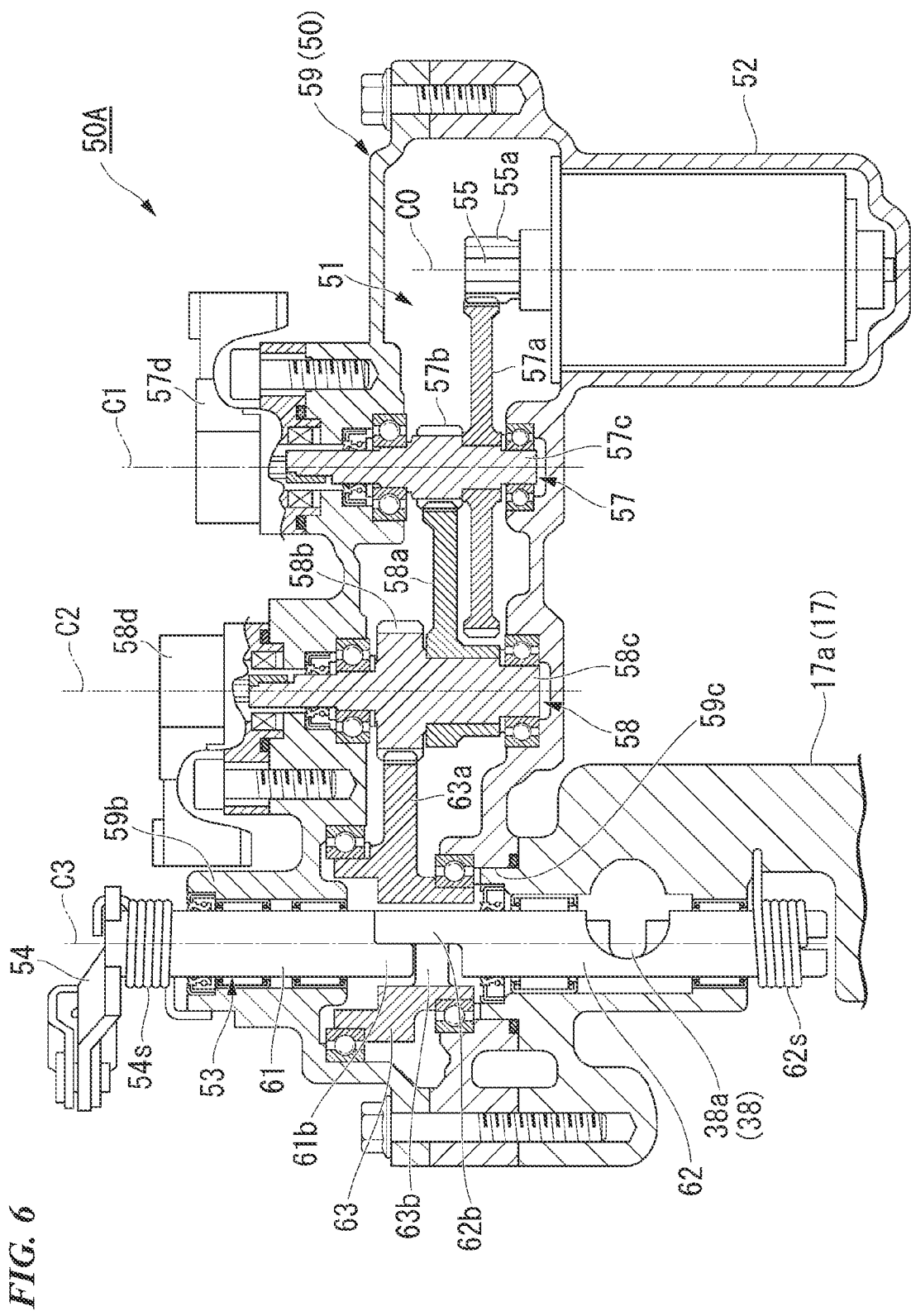
FIG. 6 is an expanded cross-sectional view along the axis direction of the clutch actuator described above.

With reference also to FIG. 5 and FIG. 6, the clutch actuator 50 controls an operation torque applied to a release shaft 53 in order to connect and disconnect the clutch apparatus 26. The clutch actuator 50 includes an electric motor 52 (hereinafter, simply referred to as a motor 52) as a drive source and a speed reduction mechanism 51 that transmits the drive force of the motor 52 to the release shaft 53. The speed reduction mechanism 51 includes a first reduction shaft 57 and a second reduction shaft 58. A first rotation angle sensor 57d and a second rotation angle sensor 58d that detect a rotation angle are provided on the shafts 57, 58, respectively.

The ECU 40 calculates a current value described below based on a preset calculation program. The current value is a value of a current supplied to the motor 52 in order to connect and disconnect the clutch apparatus 26. A supply current to the motor 52 is obtained from a correlation with a torque output to the motor 52. A target torque of the motor 52 is proportional to an operation torque (a driven clutch lever torque described later) applied to the release shaft 53. The current value supplied to the motor 52 is detected by a current sensor 40b included in the ECU 40. In accordance with the change of the detection value, the clutch actuator 50 is operated and controlled. The clutch actuator 50 is described later in detail.

Clutch Apparatus

Figure 11:
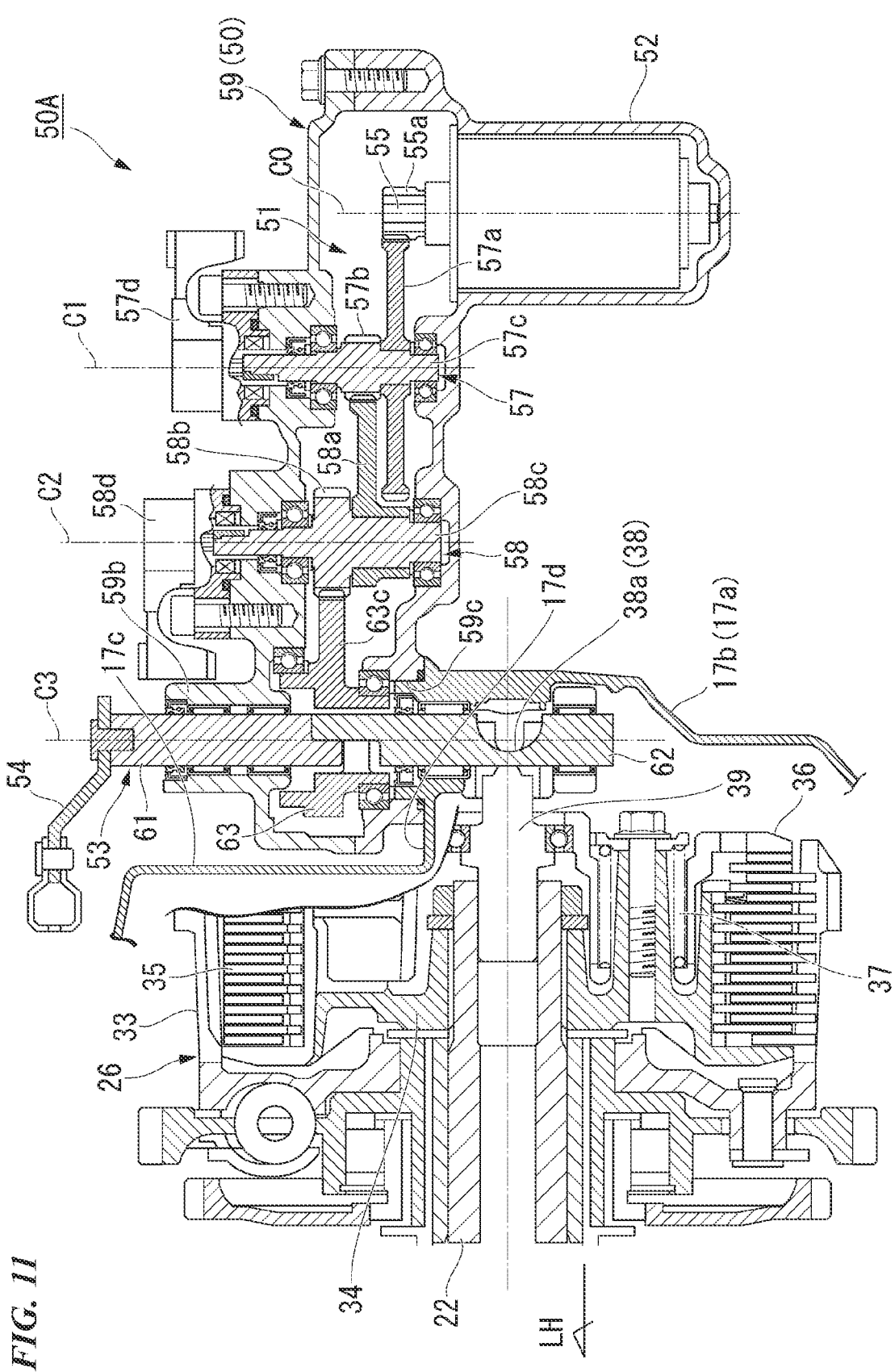
FIG. 11 is a cross-sectional view corresponding to FIG. 6 in the state where the clutch actuator described above is attached to a right cover.

As shown in FIG. 2 and FIG. 11, the clutch apparatus 26 of the embodiment is a multi-plate clutch in which a plurality of clutch plates 35 are laminated in the axis direction and is a wet clutch arranged in an oil chamber in the right cover 17a. The clutch apparatus 26 includes a clutch outer portion 33, a clutch center portion 34, and a plurality of clutch plates 35.

The clutch outer portion 33 is driven by rotation power being constantly transmitted from the crankshaft 14. The clutch center portion 34 is arranged within the clutch outer portion 33 and is integrally rotatably supported by the main shaft 22. The plurality of clutch plates 35 are laminated between the clutch outer portion 33 and the clutch center portion 34 and frictionally engage the clutch outer portion 33 and the clutch center portion 34.

A pressure plate 36 having substantially the same diameter as the clutch plate 35 is arranged on the right side (outside the vehicle width direction) of the laminated clutch plates 35. The pressure plate 36 is biased leftward in response to an elastic load of a clutch spring 37 and performs press contact of the laminated clutch plates 35 (frictional engagement). Thereby, the clutch apparatus 26 becomes a connection state in which the power can be transmitted. The clutch apparatus 26 is a normally closed clutch that is ordinarily in a connection state when there is no input from the outside.

The release of the press contact (frictional engagement) is performed by an operation of a release mechanism 38 inside the right cover 17a. The operation of the release mechanism 38 is performed by at least one of an operation of the clutch lever (not shown) by the occupant and application of a torque by the clutch actuator 50.

Release Mechanism

As shown in FIG. 2 and FIG. 11, the release mechanism 38 includes a lifter shaft 39 and the release shaft 53.

The lifter shaft 39 is held to be capable of reciprocating in the axis direction within a right portion of the main shaft 22. The release shaft 53 is arranged such that the axis direction is perpendicular to the lifter shaft 39 and is held rotatably around the shaft center on an outer portion of the right cover 17a.

A line C3 in the drawing represents a center axis line of the release shaft 53 that extends in the upward-downward direction. The axis direction of the release shaft 53 is inclined rearward such that an upper side is located at a rear side with respect to the vertical direction in an axis direction view (vehicle side view) of the main shaft 22 (refer to FIG. 1). An upper portion of the release shaft 53 protrudes to the outside of the right cover 17a, and a driven clutch lever 54 is integrally rotatably attached to the upper portion of the release shaft 53. The driven clutch lever 54 is connected to the clutch lever via an operational cable (not shown).

An eccentric cam portion 38a is provided on a lower portion of the release shaft 53 located at an inner position of the right cover 17a. The eccentric cam portion 38a is engaged with a right end portion of the lifter shaft 39. The release shaft 53 rotates about the axis center and thereby moves the lifter shaft 39 in the rightward direction by the action of the eccentric cam portion 38a. The lifter shaft 39 is capable of reciprocating integrally with the pressure plate 36 of the clutch apparatus 26. Accordingly, when the lifter shaft 39 moves rightward, the pressure plate 36 moves (lifts) rightward against a biasing force of the clutch spring 37. Thereby, the frictional engagement between the laminated clutch plates 35 is released. Thereby, the normally closed clutch apparatus 26 becomes a disconnection state in which the power cannot be transmitted.

The release mechanism 38 is not limited to the eccentric cam mechanism and may be a mechanism that includes a rack-and-pinion, a feed screw, or the like. The mechanism that connects the clutch lever to the driven clutch lever 54 is not limited to the operation cable and may be a mechanism that includes a rod, a link, or the like.

Clutch Control Mode

Figure 4:
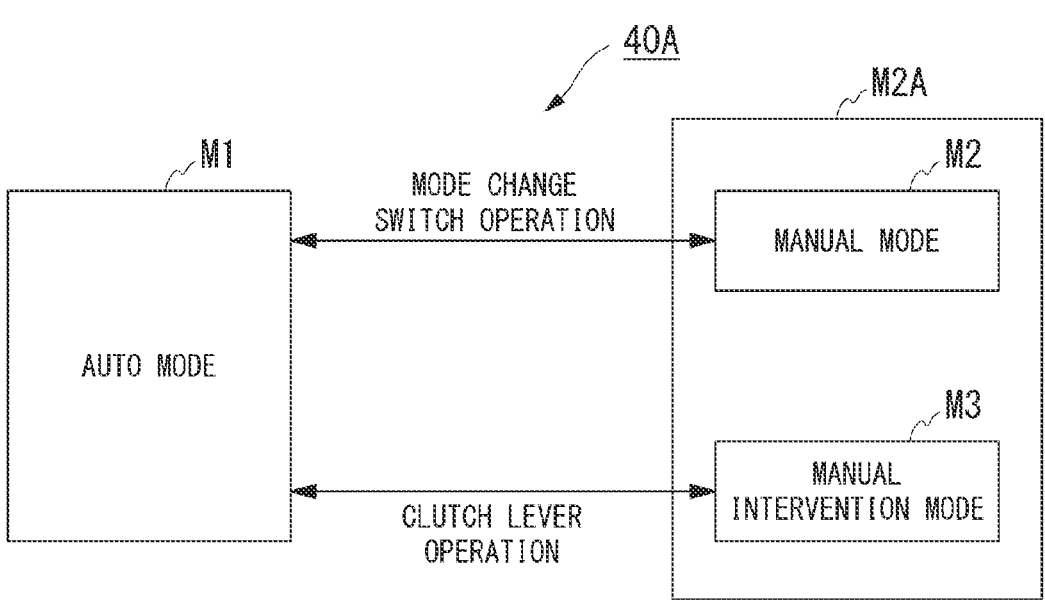
FIG. 4 is a view showing transition of a clutch control mode of the motorcycle described above.

As shown in FIG. 4, a clutch control apparatus 40A of the present embodiment has three clutch control modes. The clutch control modes include an auto mode M1 that performs an automatic control, a manual mode M2 that performs a manual operation, and a manual intervention mode M3 that performs a temporal manual operation. The clutch control mode suitably transitions among the three modes in response to the operation of a clutch control mode change switch 49 (refer to FIG. 3) and the clutch operator. A system including the manual mode M2 and the manual intervention mode M3 is referred to as a manual system M2A.

The auto mode M1 is a mode that calculates a clutch capacity suitable for the travel state in accordance with the automatic start/speed change control and controls the clutch apparatus 26. The manual mode M2 is a mode that calculates the clutch capacity in accordance with a clutch operation command by the occupant and controls the clutch apparatus 26. The manual intervention mode M3 is a mode that receives a clutch operation command from the occupant in the auto mode M1, calculates a clutch capacity from the clutch operation command, and controls the clutch apparatus 26 and is a temporal manual operation mode. A setting may be made such that, in the manual intervention mode M3, for example, when a state in which the occupant stops the operation of the clutch operator (completely released state) continues for a specified period of time, the manual intervention mode M3 returns to the auto mode M1.

For example, at the time of starting the system, the clutch control apparatus 40A starts control from a clutch-on state (connection state) and the auto mode M1. Further, the clutch control apparatus 40A is set to return to the clutch-on and the auto mode M1 when the engine 13 stops (when the system is turned off). In the normally closed clutch apparatus 26, at the time of clutch-on, electric power supply to the motor 52 of the clutch actuator 50 is not required. On the other hand, in a clutch-off state (disconnection state) of the clutch apparatus 26, electric power supply to the motor 52 is maintained.

In the auto mode M1, basically, the clutch control is performed automatically. In the auto mode M1, the motorcycle 1 can travel without a lever operation. In the auto mode M1, the clutch capacity is controlled based on the throttle open degree, the engine rotation speed, the vehicle speed, a shift sensor output, and the like. Thereby, the motorcycle 1 can start only by a throttle operation without a stall (an engine stop or an engine stall). Further, the speed change of the motorcycle 1 can be made only by the shift operation. Further, in the auto mode M1, the occupant grips the clutch lever, and thereby, the mode is switched to the manual intervention mode M3. Thereby, the clutch apparatus 26 can be arbitrarily cut.

On the other hand, in the manual mode M2, the clutch capacity can be controlled by the lever operation by the occupant (that is, the connection and disconnection of the clutch apparatus 26 can be made). The auto mode M1 and the manual mode M2 can be switched between each other. This switching is performed, for example, by operating the clutch control mode change switch 49 (refer to FIG. 3) when the motorcycle 1 is stopping and the transmission 21 is in neutral. The clutch control apparatus 40A may include an indicator that indicates a manual state at the time of transition to the manual system M2A (the manual mode M2 or the manual intervention mode M3).

In the manual mode M2, basically, the clutch control is performed manually. In the manual mode M2, the clutch capacity can be controlled in accordance with an operation angle of the clutch lever (and the operation angle of the driven clutch lever 54). Thereby, it is possible to control the connection and disconnection of the clutch apparatus 26 as intended by the occupant. Even in the manual mode M2, when the shift operation is performed without the clutch operation, the clutch control can automatically intervene. Hereinafter, the operation angle of the driven clutch lever 54 is referred to as a driven clutch lever operation angle.

In the auto-mode M1, the connection and disconnection of the clutch apparatus 26 are performed automatically by the clutch actuator 50. At this time, by performing the manual clutch operation to the clutch lever, the manual operation can temporarily intervene in the automatic control of the clutch apparatus 26 (manual intervention mode M3).

Manual Clutch Operation

In the motorcycle 1 shown in FIG. 1, a clutch lever (not shown) as a clutch manual operator is attached to a base end side (the inside in the vehicle width direction) of the left grip of the steering handle 4a.

With reference also to FIG. 2, the clutch lever is connected via the operation cable (not shown) to the driven clutch lever 54 attached to the release shaft 53 of the clutch apparatus 26. The driven clutch lever 54 is integrally rotatably attached to the upper end portion of the release shaft 53 that protrudes above the right cover 17a.

Further, the clutch control mode change switch 49 is provided, for example, on a handle switch that is attached to the steering handle 4a. Thereby, at the time of ordinary driving, the occupant can easily switch the clutch control mode.

Clutch Actuator

As shown in FIG. 1, the clutch actuator 50 is attached to a rear upper portion of the right cover 17a on the right side of the crankcase 15.

With reference also to FIG. 5 and FIG. 6, the clutch actuator 50 includes a motor 52 and a speed reduction mechanism 51.

The motor 52 is, for example, a DC motor and is arranged, for example, such that the axis direction is parallel to the release shaft 53. The motor 52 is arranged such that a drive shaft 55 protrudes upward. The speed reduction mechanism 51 transmits the drive force of the motor 52 to the release shaft 53.

In the embodiment, a plurality of (two) motors 52 are provided on a single clutch actuator 50. Hereinafter, a motor 52 located on a vehicle forward side of the clutch actuator 50 is referred to as a first motor 521, and a motor 52 located on a vehicle rearward side and an inner side in the vehicle width direction relative to the first motor 521 is referred to as a second motor 522. Lines C01, C02 in the drawing represent center axis lines (drive axis lines) of the motors 521, 522, respectively. For ease of explanation, both motors 521, 522 may be collectively referred to as a motor 52. Further, both axis lines C01, C02 may be collectively referred to as an axis line C0.

The speed reduction mechanism 51 decelerates the rotation power output from the motor 52 and transmits the rotation power to the release shaft 53. The speed reduction mechanism 51 includes, for example, a gear series in which the axis direction is parallel to the release shaft 53. The speed reduction mechanism 51 includes a drive gear 55a, a first reduction gear 57a, a first small diameter gear 57b, a second reduction gear 58a, a second small diameter gear 58b, a driven gear 63a, and a gear case 59.

The drive gear 55a is integrally provided on the drive shaft 55 of each motor 521, 522. The first reduction gear 57a is engaged with each drive gear 55a. The first small diameter gear 57b is provided coaxially with the first reduction gear 57a. The second reduction gear 58a is engaged with the first small diameter gear 57b. The second small diameter gear 58b is provided coaxially with the second reduction gear 58a. The driven gear 63a is engaged with the second small diameter gear 58b. The gear case 59 accommodates the gears.

The first reduction gear 57a and the first small diameter gear 57b are integrally rotatably supported by the first support shaft 57c. The first reduction gear 57a, the first small diameter gear 57b, and the first support shaft 57c constitute the first reduction shaft 57. The second reduction gear 58a and the second small diameter gear 58b are integrally rotatably supported by the second support shaft 58c. The second reduction gear 58a, the second small diameter gear 58b, and the second support shaft 58c constitute the second reduction shaft 58. Each of the first support shaft 57c and the second support shaft 58c is rotatably supported by the gear case 59. The second reduction gear 58a is a fan gear centered at the second support shaft 58c. The second reduction gear 58a is provided to extend forward and outward in the vehicle width direction of the second support shaft 58c. A line C1 in the drawing represents a center axis line of the first reduction shaft 57, and a line C2 represents a center axis line of the second reduction shaft 58.

The driven gear 63a is integrally rotatably provided on the release shaft 53. The driven gear 63a is a fan gear centered at the release shaft 53. The driven gear 63a is provided to extend in a forward direction of the release shaft 53. The gear on the downstream side in the speed reduction mechanism 51 has a small rotation angle. Therefore, the second reduction gear 58a and the driven gear 63a can be a fan gear having a small rotation angle.

As a result, the speed reduction mechanism 51 and the clutch actuator 50 can be downsized. That is, even when a speed reduction gear having a large diameter is provided in order to increase a speed reduction ratio, by cutting out a portion of the speed reduction gear other than the engagement region and obtaining a fan shape, the following effects are achieved. That is, in particular, it is possible to reduce the extension of the speed reduction mechanism 51 to the outside in the vehicle width direction, and it is possible to reduce the weight of the speed reduction mechanism 51.

According to such a configuration, the motor 52 and the release shaft 53 can be constantly interlocked with each other via the speed reduction mechanism 51. Thereby, a system is constituted in which the connection and disconnection of the clutch apparatus 26 are performed directly by the clutch actuator 50.

Each gear is a flat spur gear having a reduced axis direction thickness, and the gear case 59 is also formed in a flat shape having a reduced thickness in the axis direction. Thereby, it is possible to prevent the speed reduction mechanism 51 from being noticeable in a vehicle side view. A first rotation angle sensor 57d and a second rotation angle sensor 58d are provided on an upper side of the gear case 59. The first rotation angle sensor 57d and the second rotation angle sensor 58d are connected to first end portions of the first reduction shaft 57 and the second reduction shaft 58 and detect the rotation angles of the first reduction shaft 57 and the second reduction shaft 58, respectively.

The motor 52 is arranged to protrude downward from a front portion of the gear case 59. Thereby, the motor 52 can be arranged as follows. That is, the motor 52 can be arranged to avoid an expansion portion 17b of the right cover 17a that covers the clutch apparatus 26 in a forward direction. Therefore, the extension of the clutch actuator 50 to the outside in the vehicle width direction is reduced.

The drive force of the motor 52 is decelerated as follows and is transmitted to the release shaft 53. That is, the drive force of the motor 52 is decelerated between the drive gear 55a and the first reduction gear 57a, is decelerated between the first small diameter gear 57b and the second reduction gear 58*a*, and is further decelerated between the second small diameter gear 58*b* and the driven gear 63*a*.

In the embodiment, a stopper 59*a* is provided before the final stage (between the second small diameter gear 58*b* and the driven gear 63*a*) of the gear series of the speed reduction mechanism 51. The stopper 59*a* defines an initial position (a stop position in a return direction opposite to the clutch disconnection direction) of the release shaft 53. The stopper 59*a* is integrally formed, for example, inside the gear case 59. A side of the second reduction gear 58*a* having a fan shape comes into contact with the stopper 59*a*, and thereby, a stop position of the second reduction gear 58*a* is defined. By providing the stopper 59*a* at a stage having a smaller torque than the final stage of the speed reduction mechanism 51, the following effects are achieved. That is, it is possible to ensure the strength of the gear case 59 and reliably define the initial position of the release shaft 53. Further, it is possible to prevent an excess load input to the final stage at which the torque is the largest due to the deceleration and reduce the size and the weight of the gear.

Arrangement of Clutch Actuator

Figure 15:
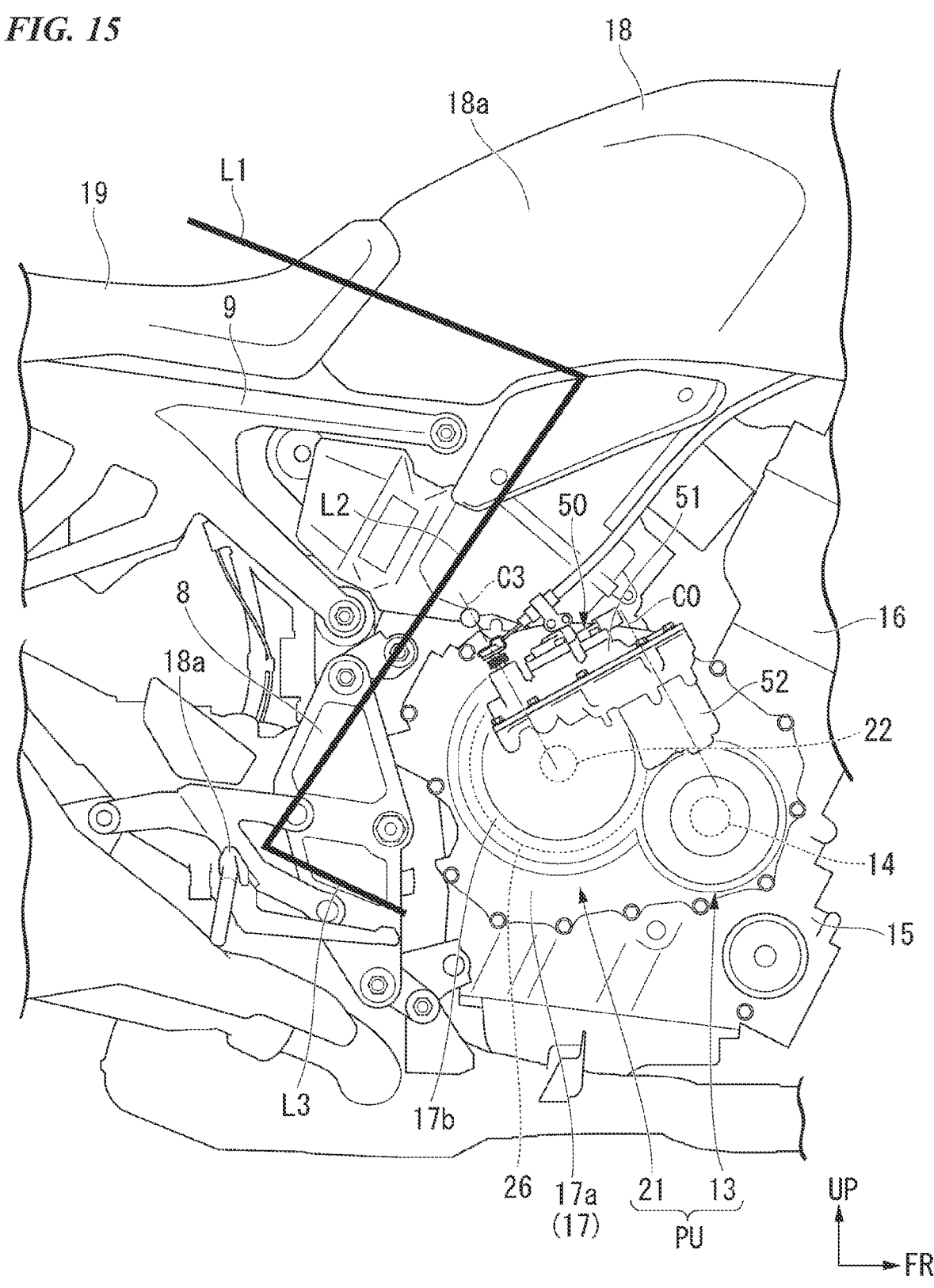
FIG. 15 is a right side view showing a main portion of the motorcycle described above.
Figure 16:
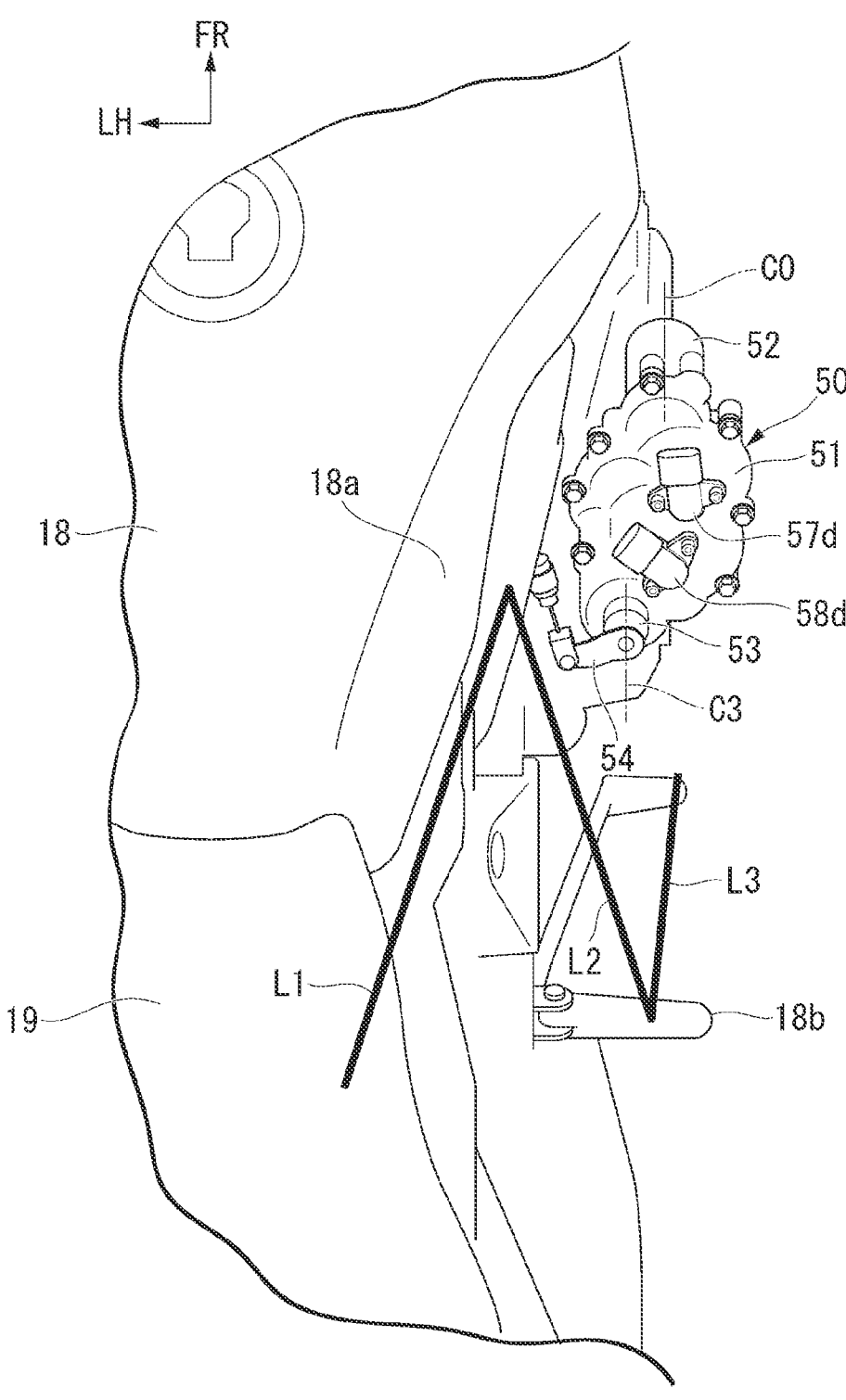
FIG. 16 is an upper view showing the main portion of the motorcycle described above.
Figure 17:
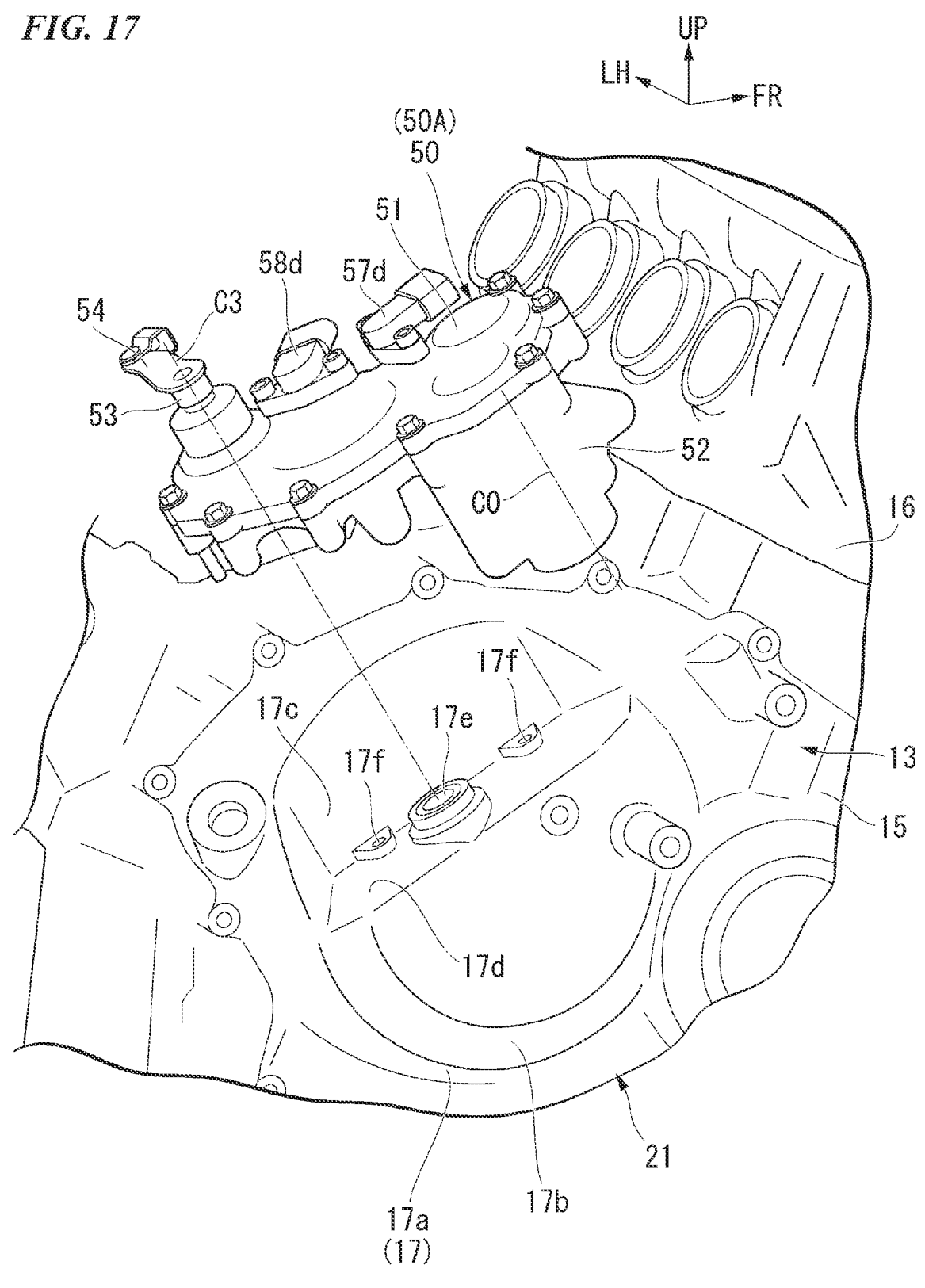
FIG. 17 is an exploded perspective view showing the main portion of the motorcycle described above.

As shown in FIG. 15 to FIG. 17, the clutch actuator 50 is arranged vertically below the knee grip portion 18*a* on the right side of the fuel tank 18 in the vehicle side view. The clutch actuator 50 is arranged to extend further outward in the vehicle width direction than the knee grip portion 18*a* on the right side of the fuel tank 18 in a vehicle top view of FIG. 16. A line L1 in the drawing shows the thigh of the driver, a line L2 shows the lower leg below the knee, and a line L3 shows the foot portion at the front from the ankle.

With respect to the leg of the driver, the lower leg L2 extends obliquely rearward and downward from the knee grip portion 18*a* in the vehicle side view, and the foot portion L3 is placed on the step 18*b*. The clutch actuator 50 extends further outward in the vehicle width direction than the knee-grip portion 18*a*. The clutch actuator 50 is arranged to avoid the lower leg L2 of the driver's leg in a forward direction in the vehicle side view. Thereby, it is possible to prevent interference of the clutch actuator 50 with respect to an arrangement space of the driver's leg. The clutch actuator 50 is arranged to avoid the lower leg L2 of the driver's leg in a forward direction in the vehicle side view even when the driver extends the leg such that the foot portion L3 reaches the ground. Also in this point, it is possible to prevent interference of the clutch actuator 50 with respect to an arrangement space of the driver's leg.

With reference to FIG. 17, the right cover 17*a* defines a range described below as the expansion portion 17*b* that expands outward in the vehicle width direction. The range is a range having a circular shape that is coaxial with the clutch apparatus 26 in the vehicle side view. A cover recess portion 17*c* is formed on a section of the expansion portion 17*b* that faces rearward and upward. In the cover recess portion 17*c*, an outer surface is varied inward in the vehicle width direction with respect to the remaining portion. The cover recess portion 17*c* defines a semicircular shape in the vehicle side view.

A string section having the semicircular shape of the cover recess portion 17*c* is formed in a linear shape perpendicular to the axis direction of the release shaft 53 in the vehicle side view. The string section forms a step section 17*d* that varies the outer surface of the expansion portion 17*b* in a stepwise manner. The step section 17*d* is inclined rearward and downward in the vehicle side view. An upper portion of the release shaft 53 protrudes obliquely upward and rearward at the step section 17*d*. The release shaft 53 penetrates through the step section 17*d* of the cover recess portion 17*c* and protrudes to the outside of the cover. The clutch actuator 50 is attached to the right cover 17*a* in a state where the clutch actuator 50 is arranged to enter the cover recess portion 17*c*.

Release Shaft

Figures 7, 8:
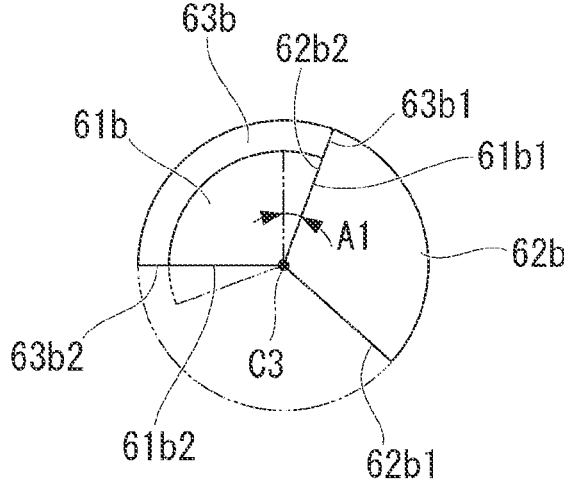
FIG. 7 is a perspective view of a release shaft that operates a clutch apparatus.
FIG. 8 is a VIII-VIII cross-sectional view of FIG. 7.

As shown in FIG. 6 to FIG. 8, the release shaft 53 is divided into a plurality of elements in order to be rotatable by individually receiving an input from the clutch actuator 50 and an input by an operation of the occupant.

The release shaft 53 includes an upper release shaft 61 that constitutes an upper portion, a lower release shaft 62 that constitutes a lower portion, and an intermediate release shaft 63. The intermediate release shaft 63 is arranged over a lower end portion of the upper release shaft 61 and an upper end portion of the lower release shaft 62.

The upper release shaft 61 defines a cylindrical shape. The upper release shaft 61 is rotatably supported by an upper boss portion 59*b* of the gear case 59. The upper release shaft 61 has an upper end portion that protrudes to the outside of the gear case 59. The driven clutch lever 54 is integrally rotatably supported by the upper end portion of the upper release shaft 61. A return spring 54*s* is attached to the driven clutch lever 54. The return spring 54*s* applies, to the driven clutch lever 54, a biasing force in the opposite direction of the rotation (rotation in the clutch disconnection direction) by the operation of the clutch operator.

The lower release shaft 62 defines a cylindrical shape. A lower portion of the lower release shaft 62 is rotatably supported inside the right cover 17*a*. The lower portion of the lower release shaft 62 faces the inside of the gear case 59. The eccentric cam portion 38*a* of the release mechanism 38 is formed on the lower portion. A lower return spring 62*s* is attached to a lower end portion of the lower release shaft 62. The lower return spring 62*s* applies, to the lower release shaft 62, a biasing force in a direction opposite to the rotation in the clutch disconnection direction.

A manual operation-side cam 61*b* that defines a fan shape in a cross-section and extends in the axis direction is provided on a lower end portion of the upper release shaft 61.

A clutch-side cam 62*b* that defines a fan shape in a cross-section and extends in the axis direction is provided on the upper end portion of the lower release shaft 62. The clutch-side cam 62*b* is provided in a range that avoids the manual operation-side cam 61*b* in the circumferential direction or the axis direction.

The lower end portion (the manual operation-side cam 61*b*) of the upper release shaft 61 and the upper end portion (the clutch-side cam 62*b*) of the lower release shaft 62 overlap each other in the axis direction position while avoiding each other in the circumferential direction. Alternatively, the manual operation-side cam 61*b* and the clutch-side cam 62*b* overlap each other in the circumferential direction position while avoiding each other in the axis direction. Thereby, a circumferential direction one side surface 61*b*1 of the manual operation-side cam 61*b* can press a circumferential direction other side surface 62*b*2 of the clutch-side cam 62*b*, and the lower release shaft 62 can be rotated (refer to FIG. 9B, FIG. 10B).

A circumferential direction other side surface 61*b*2 of the manual operation-side cam 61*b* and a circumferential direction one side surface 62*b*1 of the clutch-side cam 62*b* are separated from each other in the circumferential direction or the axis direction. Thereby, when there is an input to the clutch-side cam 62b from the clutch actuator 50, the lower release shaft 62 can rotate independently of the upper release shaft 61 (refer to FIG. 9A, FIG. 10A).

The intermediate release shaft 63 defines a cylindrical shape. An engagement portion (an upper and lower shaft engagement portion) between the lower end portion of the upper release shaft 61 and the upper end portion of the lower release shaft 62 is capable of being inserted through the intermediate release shaft 63. The driven gear 63a is integrally rotatably supported by the intermediate release shaft 63.

A control operation-side cam 63b that defines a fan shape in a cross-section and extends in the axis direction is provided on the intermediate release shaft 63.

The intermediate release shaft 63 and the driven gear 63a are prevented from being in contact with other components of the clutch actuator 50. Specifically, the inner circumferential portion of the intermediate release shaft 63 is in contact with only the following portions in addition to a bearing that is supported by the gear case 59. The portions are the lower end portion (the manual operation-side cam 61b) of the upper release shaft 61 and the upper end portion (the clutch-side cam 62b) of the lower release shaft 62.

The control operation-side cam 63b of the intermediate release shaft 63 is engaged with the following portions with a clearance in the axis direction. The portions are the manual operation-side cam 61b of the upper release shaft 61 and the clutch-side cam 62b of the lower release shaft 62.

Further, only the gear teeth of the driven gear 63a are in contact with the second small diameter gear 58b. Thereby, friction of the driven gear 63a as a control gear is reduced as much as possible, and the accuracy of control of the release shaft 53 is improved.

The control operation-side cam 63b of the intermediate release shaft 63 and the clutch-side cam 62b of the lower release shaft 62 overlap each other in the axis direction position while avoiding each other in the circumferential direction. Alternatively, the control operation-side cam 63b and the clutch-side cam 62b overlap each other in the circumferential direction position while avoiding each other in the axis direction. Thereby, a circumferential direction one side surface 63b1 of the control operation-side cam 63b can press the circumferential direction other side surface 62b2 of the clutch-side cam 62b, and the lower release shaft 62 can be rotated.

Further, the control operation-side cam 63b is arranged to avoid the manual operation-side cam 61b of the upper release shaft 61 in the axis direction or a radial direction. Thereby, when an input from the clutch actuator 50 is transmitted to the clutch-side cam 62b, the lower release shaft 62 can be rotated independently of the upper release shaft 61. Further, when a manual operation is performed, the upper release shaft 61 can be rotated independently of the intermediate release shaft 63 on the control side.

A circumferential direction other side surface 63b2 of the control operation-side cam 63b and the circumferential direction one side surface 62b1 of the clutch-side cam 62b are separated from each other in the circumferential direction. Thereby, when there is an input from the manual operation-side cam 63b to the clutch-side cam 62b, the lower release shaft 62 can be rotated independently of the intermediate release shaft 63.

With reference to FIG. 11 and FIG. 17, the clutch actuator 50 holds the upper release shaft 61 and the intermediate release shaft 63 rotatably using the gear case 59. The clutch actuator 50 constitutes an integral actuator unit 50A that includes the upper release shaft 61 and the intermediate release shaft 63.

The lower release shaft 62 is rotatably held by the right cover 17a. An opening portion 17e and a fastening portion 17f of the gear case 59 are provided on the step section 17d of the cover recess portion 17c of the right cover 17a. The upper end portion of the lower release shaft 62 protrudes from the opening portion 17e. An opening portion 59c is provided on a portion of the gear case 59 that faces the step section 17d of the cover recess portion 17c. The opening portion 59c allows the upper end portion of the lower release shaft 62 to face the inside of the gear case 59.

In such a configuration, when the actuator unit 50A is attached to the right cover 17a, a release shaft 53 having a linear shape is constituted. The release shaft 53 is constituted by mutually connecting the upper release shaft 61, the intermediate release shaft 63, and the lower release shaft 62.

The power unit PU of the embodiment can be constituted as follows differently from a manual clutch-type power unit in which the connection-disconnection operation of the clutch apparatus 26 is not performed by electric control but is performed by the operation of the driver. That is, the power unit PU can be constituted by replacing the right cover 17a and the release shaft 53 and attaching the actuator unit 50A afterward. Therefore, the actuator unit 50A can also be attached to a power unit of a different model. Therefore, the actuator unit 50A can be shared by multiple models, and it is possible to easily constitute a semi-automatic transmission system (automatic clutch transmission system).

Clutch Control

Figure 12:
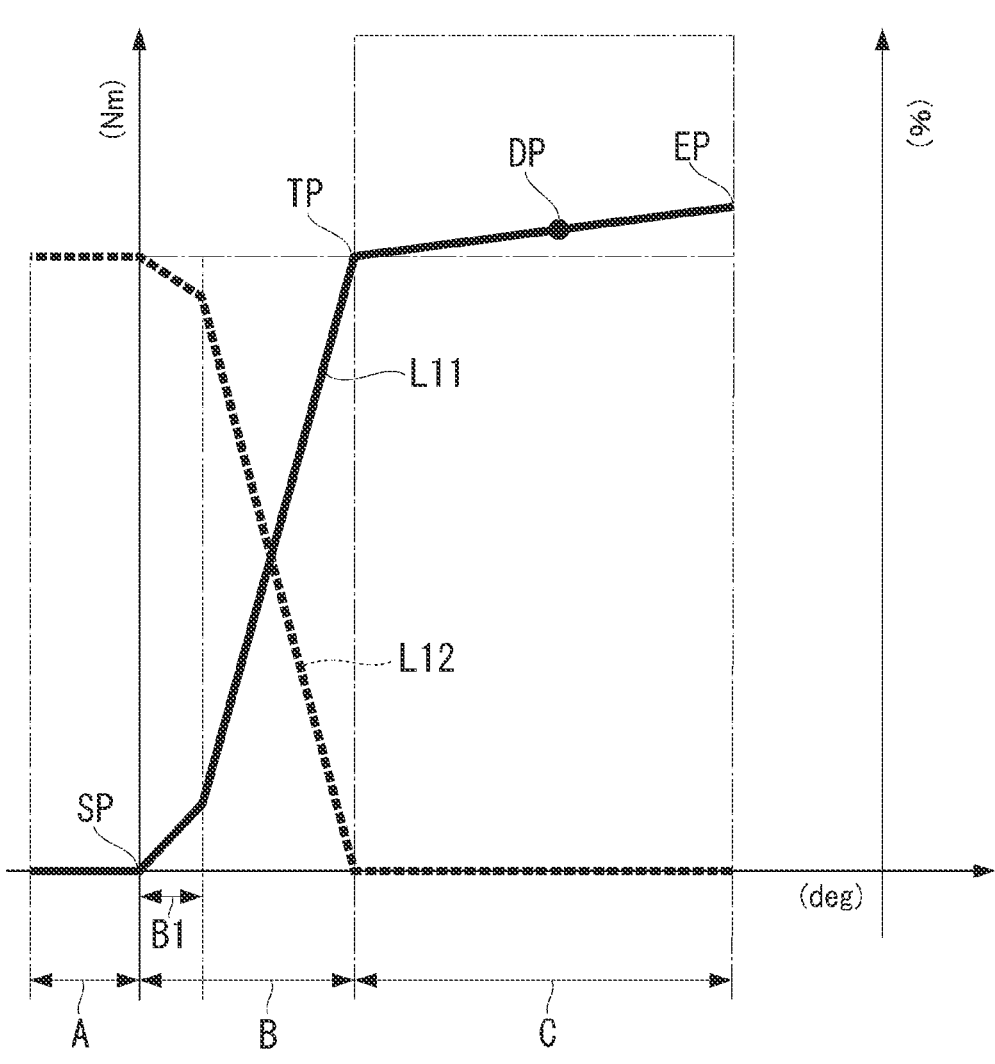
FIG. 12 is a graph showing the characteristics of a clutch control in which the vertical axis shows an output value of the clutch actuator, and the horizontal axis shows an operation amount of a release mechanism.

Next, a clutch control of the embodiment is described with reference to a graph of FIG. 12. The graph of FIG. 12 shows clutch characteristics in the auto mode M1. In the graph of FIG. 12, the vertical axis represents a torque (Nm) and a clutch capacity (%) applied to the driven clutch lever 54, and the horizontal axis represents an operation angle (deg) of the driven clutch lever 54. The operation angle of the driven clutch lever 54 is an operation angle of the lower release shaft 62.

The torque of the driven clutch lever 54 is a torque generated by the lower release shaft 62. This torque corresponds to a torque value calculated by multiplying the following primary torque value by a deceleration ratio of the speed reduction mechanism 51. The primary torque value is obtained based on a supply current value to the motor 52 from the correlation between a supply current to the motor 52 and a torque generated by the motor 52.

Hereinafter, the torque of the driven clutch lever 54 is referred to as a driven clutch lever torque. The correlation between the driven clutch lever operation angle and the driven clutch lever torque is shown by a line L11 in the graph. The correlation between the driven clutch lever operation angle and the clutch capacity is shown by a line L12 in the graph. The line L11 is also a line showing an output value (reference output value) of the clutch actuator 50 when the clutch apparatus 26 is connected and disconnected in a state where the manual operation does not intervene.

In the auto mode M1 of the normally closed clutch, when the driven clutch lever torque (motor output) is "0", there is no operation input (input to the disconnection side) to the clutch apparatus 26, and the clutch capacity becomes 100%. That is, the clutch apparatus 26 maintains a connection state. This state corresponds to a region A in the horizontal axis of FIG. 12. The region A is a play region of the driven clutch lever 54. In the region A, there is no motor output, and the driven clutch lever torque stays at "0". In the region A, there is no operation of the clutch apparatus 26, and the clutch capacity stays at 100%.

With reference also to FIG. 8, in the region A, the circumferential direction one side surface 61*b*1 of the manual operation-side cam 61*b* of the release shaft 53 does not press the circumferential direction other side surface 62*b*2 of the clutch-side cam 62*b*. At this time, the manual operation-side cam 61*b* is separated from the clutch-side cam 62*b* by the biasing force of the return spring 54*s* (shown by a chain line in FIG. 8). In the region A, the driven clutch lever 54 is in a play state in which the manual operation-side cam 61*b* is capable of approaching to and separating from the clutch-side cam 62*b* by an angle A1 in the drawing. For example, in the region A, the circumferential direction one side surface 63*b*1 of the control operation-side cam 63*b* is in a contact state with the circumferential direction other side surface 62*b*2 of the clutch-side cam 62*b*.

With reference to FIG. 12, when the driven clutch lever operation angle increases and passes through the play region A, the driven clutch lever operation angle shifts to a half-clutch region B. In the half-clutch region B, the driven clutch lever torque starts to increase by the operation of the motor 52.

Figure 9A:
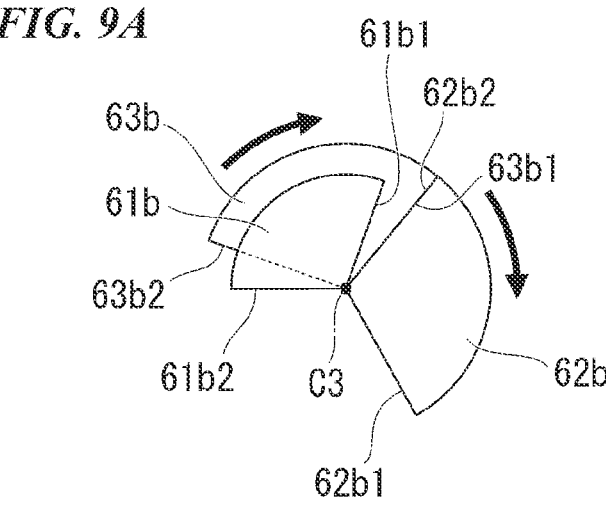
FIG. 9A is a cross-sectional view corresponding to FIG. 8 and shows an action in a half-clutch region of the release shaft described above and a drive time using the clutch actuator.
Figure 9B:
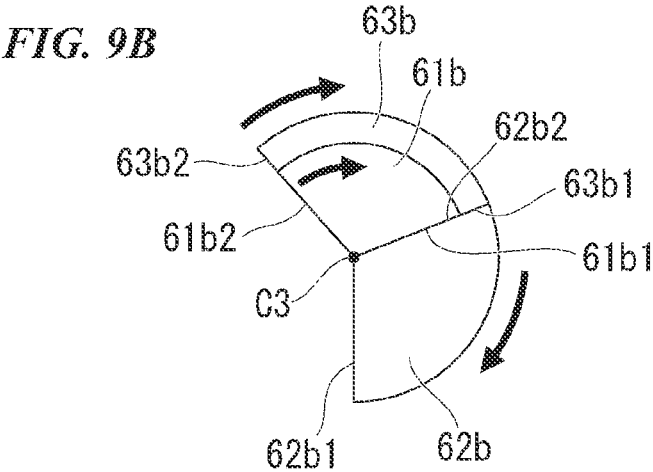
FIG. 9B is a cross-sectional view corresponding to FIG. 8 and shows an action in the half-clutch region of the release shaft described above and a manual intervention time.

With reference also to FIG. 9A, in the half-clutch region B, the control operation-side cam 63*b* presses the clutch-side cam 62*b* and rotates the lower release shaft 62. When the driven clutch lever torque increases, the release mechanism 38 causes the clutch apparatus 26 to perform a lift operation and reduces the clutch capacity. That is, the clutch apparatus 26 becomes a half-clutch state which enables some power transmission. In FIG. 12, reference numeral SP represents a start position (operation start position) of an operation which switches from the play region A to the half-clutch region B. In the half-clutch region B, when the manual operation intervenes, the manual operation-side cam 61*b* comes into contact with the clutch-side cam 62*b*. At this time, the manual operation-side cam 61*b* rotates the lower release shaft 62 in cooperation with the control operation-side cam 63*b* (refer to FIG. 9B).

With reference to FIG. 12, in the half-clutch region B, the driven clutch lever torque steeply increases in accordance with the increase of the driven clutch lever operation angle and causes the clutch apparatus 26 to operate to the disconnection side. For example, at the beginning of the half-clutch region B, there is an influence of a clutch judder spring reaction force (not shown). Thereby, at the beginning of the half-clutch region B, a deceleration region B1 is set in which the increase of the driven clutch lever torque with respect to the increase of the driven clutch lever operation angle is moderate.

In the half-clutch region B, the clutch capacity steeply decreases in accordance with the increase of the driven clutch lever operation angle so as to be inversely proportional to the increase of the driven clutch lever torque. In the deceleration region B1 at the beginning of the half-clutch region B, the clutch capacity moderately decreases in accordance with the increase of the driven clutch lever torque becoming moderate.

When the driven clutch lever operation angle passes through a touch point TP which is an end point of the half-clutch region B, the increase of the driven clutch lever torque becomes more moderate than that of the deceleration region B1. A region after the touch point TP in the driven clutch lever operation angle is, for example, a clutch disconnection region C in which the clutch capacity stays at substantially "0". The clutch disconnection region C is, for example, an operation margin region for the driven clutch lever 54 or the like to operate to a mechanical operation limit position. In the clutch disconnection region C, the driven clutch lever torque slightly increases. This increase amount corresponds to an increase amount of a clutch spring load associated with the movement of a lift component of the clutch apparatus 26. Reference numeral EP in FIG. 12 represents a full lift position which is an end point of the clutch disconnection region C.

For example, a standby position DP is set in the middle of the clutch disconnection region C. The following driven clutch lever torque is applied at the standby position DP. The driven clutch lever torque at this time is slightly higher than the torque of the touch point TP at which the clutch apparatus 26 starts the connection. At the touch point TP, a certain torque transmission may occur due to an operation error. On the other hand, by applying the driven clutch lever torque to the torque at the standby position DP, the torque transmission of the clutch apparatus 26 is completely disconnected. Further, at the standby position DP, by applying a slightly lower driven clutch lever torque than that at a full lift position EP, it becomes possible to perform invalid filling of the clutch apparatus 26. That is, at the standby position DP, it is possible to cancel an operation reaction force and rattling of each portion in the clutch apparatus 26 or the like, and it is possible to enhance the operation responsiveness at the time of connection of the clutch apparatus 26.

When the clutch apparatus 26 operates from the connection state to the disconnection side, the operation start position SP and the touch point TP are determined as follows. That is, a point (a start point of the half-clutch region B) at which the driven clutch lever torque rises is the operation start position SP. Further, a point (an end point of the half-clutch region B) at which the clutch apparatus 26 is completely disconnected is the touch point TP.

Conversely, when the clutch apparatus 26 operates from the disconnection state to the connection side, the touch point TP and the operation start position SP are determined as follows. That is, a point at which the clutch apparatus 26 starts to be connected is the touch point TP. Further, a point at which the clutch apparatus 26 is completely connected is the operation start position SP.

Figure 13:
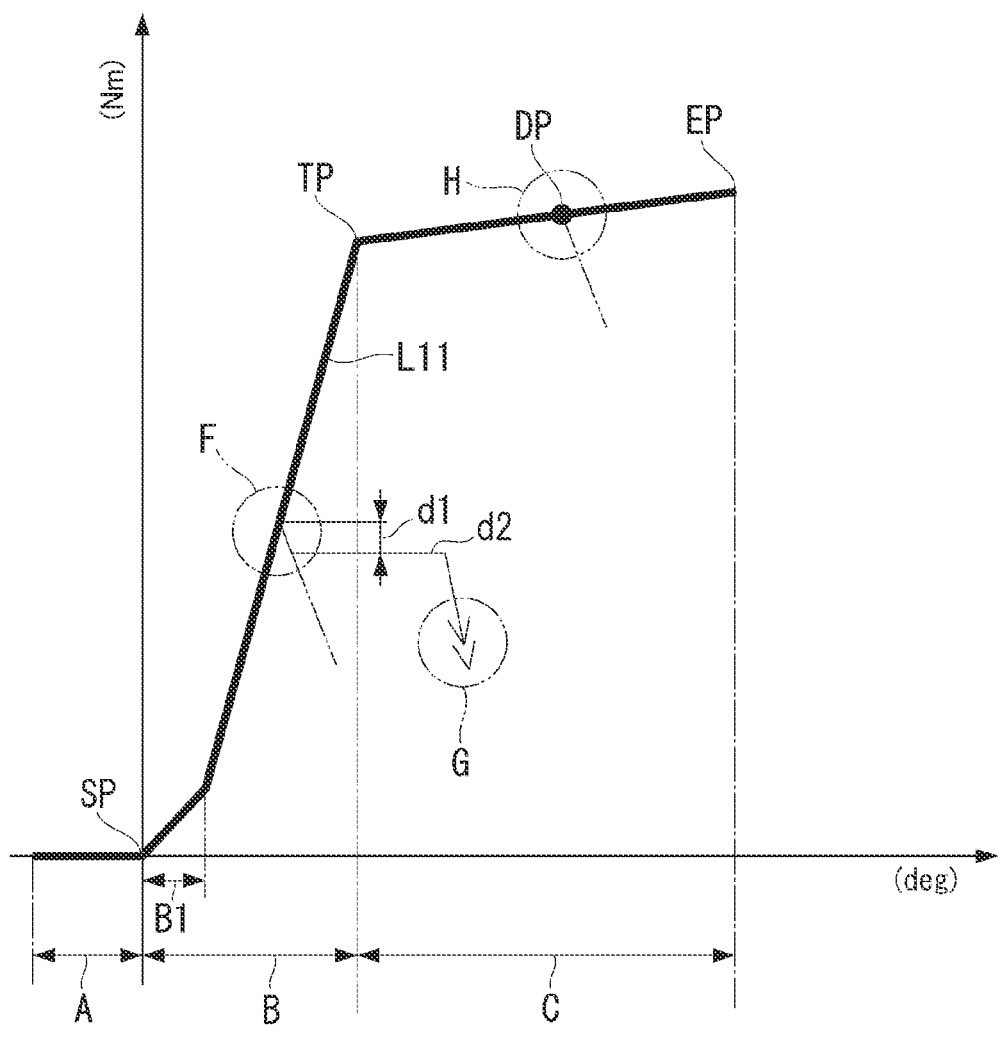
FIG. 13 is a graph corresponding to FIG. 12 and shows a first action of the embodiment.

With reference to FIG. 13, in the half-clutch region B, the drive of the motor 52 is controlled based on a lift load.

In such a control, first, a clutch spring load is set in advance based on an elastic force of the clutch spring 37. Next, a lift load (an operation load against the clutch spring load) that acts on the clutch apparatus 26 is estimated in accordance with the driven clutch lever torque. Then, a load obtained by subtracting the lift load from the clutch spring load is set as a clutch push load that is actually applied to the clutch apparatus 26.

The clutch capacity is obtained by "the clutch push load/the clutch spring load". The electric power supplied to the motor 52 is controlled, and the driven clutch lever torque and the lift load are controlled such that the clutch capacity becomes a target value. A motor current value and a lever operation angle at each of the operation start position SP and the touch point TP are set to a preset value. Alternatively, the motor current value and the lever operation angle are set by a learning control when the electric power supply of the motorcycle 1 is ON or OFF and the like as described later.

Examples of a sensing configuration include the following configuration. That is, a current sensor 40*b* is provided in a motor control device (ECU 40), and a detection value is converted into a motor torque and is further converted to the driven clutch lever torque (clutch operation torque).

As shown in FIG. 13, in the half-clutch region B, when there is intervention of the operation (manual operation) of the clutch lever, there is the following action. That is, an actual measurement value of the driven clutch lever torque decreases with respect to the correlation line L11 of the preset driven clutch lever torque (refer to part F in the drawing). At this time, when the reduction amount of the driven clutch lever torque exceeds a predetermined threshold value d1, it is determined that there is intervention of a manual operation, and the control shifts to a predetermined manual operation intervention control.

In the manual operation intervention control, for example, after the manual operation intervention is detected, control is performed as follows until the increase amount of the driven clutch lever operation angle becomes equal to or more than a predetermined angle. That is, feedback control of the motor 52 is performed so as to maintain a torque d2 after the driven clutch lever torque is decreased by the threshold d1.

During the current control at this time, a current limit in accordance with the angle is set after the touch point TP. Therefore, the motor output becomes approximately zero in the current control. Since the load at that time is sufficiently low, it is determined that manual intervention is performed. Thereby, it is possible to prevent an unusual feeling due to the torque from the motor 52 suddenly vanishing after the clutch lever is operated.

After the increase amount of the driven clutch lever operation angle is equal to or more than a prescribed angle, the driven clutch lever torque is gradually reduced (refer to part G in the drawing). Thereby, it is possible to reduce the electric power consumption by maintaining driving of the motor 52 while preventing the unusual feeling described above.

In the clutch disconnection region C, the drive of the motor 52 is controlled based on a lever position (angle).

As described above, in the clutch disconnection region C, the increase of the driven clutch lever torque associated with the lifting of the clutch apparatus 26 is small.

Therefore, in the clutch disconnection region C, the electric power supplied to the motor 52 is controlled based on the driven clutch lever operation angle. Thereby, it is possible to further precisely control the amount of disconnection of the clutch apparatus 26 after the touch point TP at which the clutch apparatus 26 starts connection.

Examples of the sensing configuration include the following configuration. That is, the first rotation angle sensor 57*d* and the second rotation angle sensor 58*d* are provided on the first reduction shaft 57 and the second reduction shaft 58, respectively. The detection value of these sensors is converted into the driven clutch lever operation angle (clutch operation angle). A pair of the first rotation angle sensor 57*d* and the second rotation angle sensor 58*d* are provided for the case of failure; however, only one of these may be provided.

As shown in FIG. 13, in the clutch disconnection region C, when there is intervention of an operation (manual operation) of the clutch lever, there is the following action. That is, an actual measurement value of the driven clutch lever torque decreases with respect to the correlation line L11 of the preset driven clutch lever torque (refer to part H in the drawing).

Figure 10A:
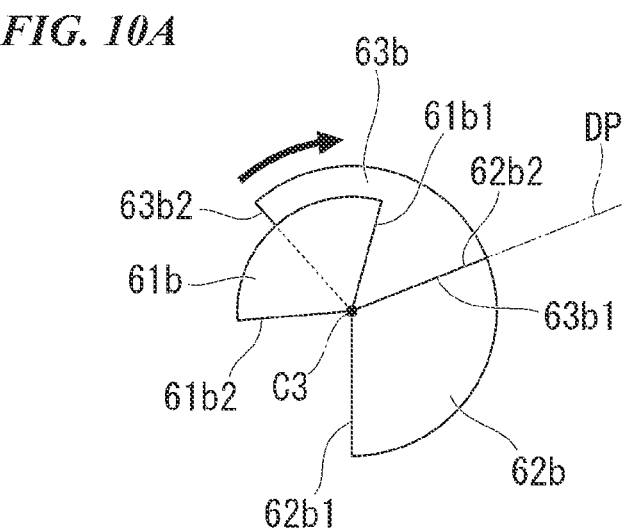
FIG. 10A is a cross-sectional view corresponding to FIG. 8 and shows an action at a standby position of the release shaft described above and the drive time using the clutch actuator.
Figure 10B:
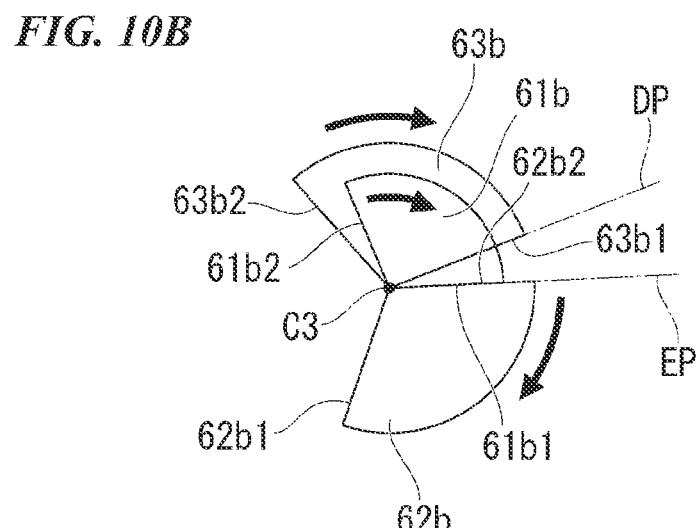
FIG. 10B is a cross-sectional view corresponding to FIG. 8 and shows an action at the standby position of the release shaft described above and the manual intervention time.

With reference also to FIG. 10A, for example, in the auto mode M1, the torque applied to the clutch-side cam 62*b* by the control operation-side cam 63*b* is limited by an upper limit torque which is a torque to the standby position DP. The torque until the clutch-side cam 62*b* crosses over the standby position DP and arrives at the full lift position EP is applied when a manual operation of gripping the clutch lever intervenes. At this time, a torque sufficient to cross over the standby position DP is applied from the manual operation-side cam 61*b* to the clutch-side cam 62*b* (refer to FIG. 10B). At this time, the control operation-side cam 63*b* is separated from the clutch-side cam 62*b*, and the motor output becomes substantially zero.

Even before arriving at the standby position DP, when the driven clutch lever operation angle is in the clutch disconnection region C beyond the touch point TP, there is the following action. That is, due to intervention of the manual operation, the actual measurement value of the driven clutch lever torque becomes substantially zero. Accordingly, in the clutch disconnection region C, when the actual measurement value of the driven clutch lever torque is changed in a range of substantially zero, it is determined that there is intervention of the manual operation. Then, the control shifts to the predetermined manual operation intervention control.

In the manual operation intervention control, for example, control is performed as follows until the increase amount of the driven clutch lever operation angle is equal to or more than a predetermined angle after the manual operation intervention is detected. That is, the motor output is maintained such that the driven clutch lever operation angle maintains the touch point TP which is a substantial clutch disconnection position. Thereby, even when the clutch lever is suddenly released after intervention of the manual operation, the occurrence of engine stall is prevented.

In this way, by using a load (current) control or a position (angle) control in accordance with the situation of the clutch apparatus 26, it is possible to perform further fine clutch control (optimum control in accordance with the state and characteristics of the clutch apparatus 26).

In the embodiment, the driven clutch lever operation angle (the rotation angle of a gear shaft of the speed reduction mechanism 51) is detected, and control is performed as follows. That is, in a region (half-clutch region B) to the preset (or learned) touch point TP, control is performed in which the reference of a current value is increased. In the region (clutch disconnection region C) after touch point TP, control is performed in which the reference of an operation angle is increased.

Further, in the embodiment, the change in the current value (converted to the torque value) of the motor 52 with respect to the driven clutch lever operation angle is learned (updated) at a predetermined time, and a target value in accordance with the situation of the clutch apparatus 26 is set. Feedback control on the drive of the motor 52 is performed based on this target value and the detection value of the current sensor 40*b* of the ECU 40.

Correction of Control Reference Value

Figure 14:
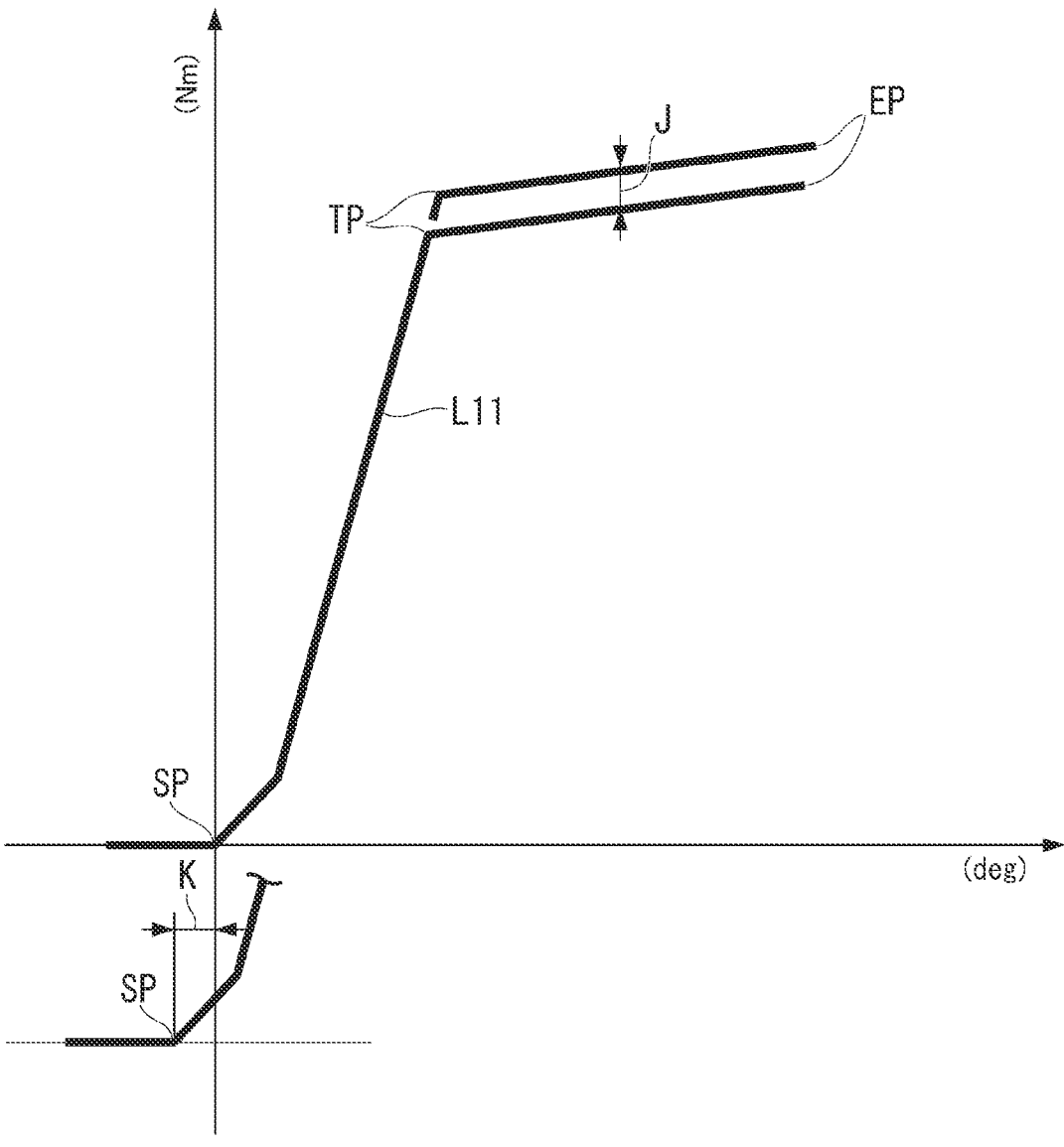
FIG. 14 is a graph corresponding to FIG. 12 and shows a second action of the embodiment.

Next, control of learning the current and the angle at the touch point TP or the like of the embodiment will be described with reference to a graph of FIG. 14. The graph of FIG. 14 shows a situation in which the correlation line L11 representing the clutch characteristics shown in FIG. 12 and FIG. 13 is changed depending on wear of the clutch plate 35 and the temperature (for example, the cooling water temperature) of the engine 13. In FIG. 14, the vertical axis represents the driven clutch lever torque (Nm), and the horizontal axis represents the driven clutch lever operation angle (deg).

In the embodiment, for example, when the main switch (electric power supply) of the motorcycle 1 is ON or OFF, a zero point (the operation start position SP and the touch point TP) at the time of clutch capacity control is corrected. In the current control of the motor 52, since the temperature change affects the motor torque, the height of the correlation line L11 is changed depending on the temperature (refer to J in the drawing). Accordingly, for example, in each of a plurality of temperature ranges such as whether or not the engine temperature is equal to or more than 80 degrees (whether or not after engine warm-up), the correction of zero point is performed. The zero point at this time is stored in a memory and is used for the next clutch capacity control.

An example of a procedure for setting (learning) the operation start position SP and the touch point TP will be described. First, for example, when the electric power supply of the ECU 40 is ON or OFF, the clutch actuator 50 is operated. At this time, the change of a current value until the disconnection of the clutch apparatus 26 is measured. Next, the slope (change rate) of the change of the current value from the play region A to the half-clutch region B is detected. Further, the slope (change rate) of the change of the current value from the half-clutch region B to the clutch disconnection region C is detected. A point where the slope of the former is equal to or more than a threshold value is defined as the operation start position SP. A point where the slope of the latter is equal to or less than the threshold value is defined as the touch point TP.

Alternatively, the following portion may be learned as the operation start position SP. The portion is a portion (a portion where the speed becomes maximum) where deceleration is started from a state in which the angular speed of the rotation angle sensor is accelerated after the current is increased by a ramp control from the clutch play region.

Conversely, the following portion may be learned as the touch point TP. The portion is a portion (a portion where speed becomes maximum) where deceleration is started from a state in which the angular speed of the rotation angle sensor is accelerated after the current is decreased by a ramp control from the clutch disconnection state (held in the region).

Further, at a timing similar to that described above, it is determined whether or not the driven clutch lever operation angle is decreased by a specified value or more. When the driven clutch lever operation angle is significantly reduced, wear of the clutch plate 35 may occur.

That is, in the normally closed clutch, when the clutch plate 35 is worn out, the lifter shaft 39 moves to a side away from the release mechanism 38. Thereby, when the clutch plate 35 is worn out, the play of the release mechanism 38 is reduced. Thereby, the release shaft 53 causes the clutch apparatus 26 to operate to the disconnection side at a small operation angle. Thereby, the driven clutch lever operation angle is reduced at the operation start position SP at which the play region A is switched to the half-clutch region B (refer to K in the drawing). Accordingly, when the driven clutch lever operation angle of the operation start position SP is reduced by the specified value or more, it is possible to predict that wear of the clutch plate 35 occurs. When wear of the clutch plate 35 is predicted (detected), it is possible to warn a user by using an indicator 40c (refer to FIG. 3) provided on a meter device or the like.

The motor current and the lever operation angle at the touch point TP and the like are learned every time the electric power supply of the motorcycle 1 is ON or OFF. Thereby, it becomes possible to perform control using the touch point TP and the like with high accuracy. Further, it becomes also possible to predict (detect) wear of the clutch plate 35.

From the relationship between the lever operation angle and the motor current, the motor current and the lever operation angle at the touch point TP at which the clutch apparatus 26 starts connection are learned. Thereby, it becomes possible to perform clutch control in light of the effects of friction, wear, and temperature.

As described above, the clutch control apparatus in the embodiment described above includes: the clutch apparatus 26 that connects and disconnects the power transmission between the engine 13 and the transmission 21: the clutch actuator 50 that outputs a drive force for operating the clutch apparatus 26; and the release mechanism 38 that receives the drive force of the clutch actuator 50 and operates the clutch apparatus 26. The release mechanism 38 includes the release shaft 53 that transmits the drive force of the clutch actuator 50 to the clutch apparatus 26 side. The release shaft 53 is divided into the lower shaft 62 that is supported by the right cover 17a as a separate body from the clutch actuator 50 and the middle shaft 63 that is supported by the clutch actuator 50 and is attachable to and detachable from the lower shaft 62. The clutch actuator 50 configures the integral actuator unit 50A that includes the middle shaft 63.

According to this configuration, the clutch actuator 50 configures the integral actuator unit 50A that includes the middle shaft 63. Therefore, the actuator unit 50A can be attached afterward and be efficiently arranged in the vicinity of the clutch apparatus 26.

Further, in the clutch control apparatus described above, the right cover 17a is a cover member that covers the clutch apparatus 26. The cover recess portion 17c to which the actuator unit 50A is attachable in a state where the actuator unit 50A enters the cover recess portion 17c is formed on the right cover 17a.

According to this configuration, the cover recess portion 17c to which the actuator unit 50A is attached is formed on the right cover 17a that covers the clutch apparatus 26. Therefore, the actuator unit 50A can be compactly arranged. Further, the actuator unit 50A can be arranged as close as possible to the clutch apparatus 26.

Further, the clutch control apparatus described above includes the ECU 40 that drives and controls the clutch actuator 50. The ECU 40 enables intervention of a manual operation by the clutch operator in an automatic control of the clutch apparatus 26 by the drive of the clutch actuator 50. The ECU 40 shifts to a predetermined manual operation intervention control when there is intervention of the manual operation. The release shaft 53 is divided into: the upper shaft 61 to which the driven clutch lever 54 that interlocks with the clutch operator is attached; the middle shaft 63; and the lower shaft 62. The clutch actuator 50 configures the actuator unit 50A that includes the upper shaft 61 and the middle shaft 63.

According to this configuration, in a system in which intervention of a manual operation is possible, the clutch actuator 50 configures an integral actuator unit 50A that includes the upper shaft 61 and the middle shaft 63. Therefore, the actuator unit 50A can be attached afterward and be efficiently arranged in the vicinity of the clutch apparatus 26.

Further, in the clutch control apparatus described above, the clutch control apparatus is applied to the motorcycle 1. When the actuator unit 50A is mounted on the vehicle, the speed reduction mechanism 51 of the clutch actuator 50 and the motor 52 are arranged at a forward position of the driven clutch lever 54.

According to this configuration, the speed reduction mechanism 51 and the motor 52, which are bulky, are arranged at a forward position of the driven clutch lever 54. Therefore, it is possible to reduce the impact on a space (a space where the driver's legs in the saddle riding vehicle are located) at the rearward side of the driven clutch lever 54.

Further, in the clutch control apparatus described above, the middle shaft 63 is arranged to be spaced in the axis direction from the upper shaft 61 and the lower shaft 62. According to this configuration, the friction of the middle shaft can be reduced as much as possible, and the accuracy of the clutch control can be improved.

Further, in the clutch control apparatus described above, the speed reduction mechanism 51 includes a fan gear (the second reduction gear 58a, the driven gear 63a) having a portion that is cut out in the circumferential direction.

According to this configuration, it is possible to reduce the size and the weight of the speed reduction mechanism 51 compared to the case where the fan gear is a circular gear.

Further, in the clutch control apparatus described above, the speed reduction mechanism 51 is a speed reduction mechanism that decelerates the drive force of the motor 52 in a step-by-step manner and transmits the drive force to the middle shaft 63. The speed reduction mechanism 51 includes: the driven gear 63a that rotates integrally with the middle shaft 63; and the stopper 59a that defines the rotation reference position of the gear (the second reduction gear 58a closer to the motor 52 than the driven gear 63a) in the deceleration path.

According to this configuration, the stopper 59a that defines the rotation reference position for the second reduction gear 58a on the further upstream side (the motor 52 side) than the driven gear 63a that is most decelerated is provided. Therefore, it is possible to reduce a load input to the stopper 59a compared to the case where the stopper 59a is provided on the driven gear 63a at the final stage. Further, it is possible to prevent an excess load input to the final stage in which the torque is the largest due to the deceleration, and the size and the weight of the gear can be reduced.

Modification Example of Clutch Actuator

Figure 18:
FIG. 18 is a perspective view showing a main portion of a clutch actuator of a modification example of the embodiment.
Figure 19:
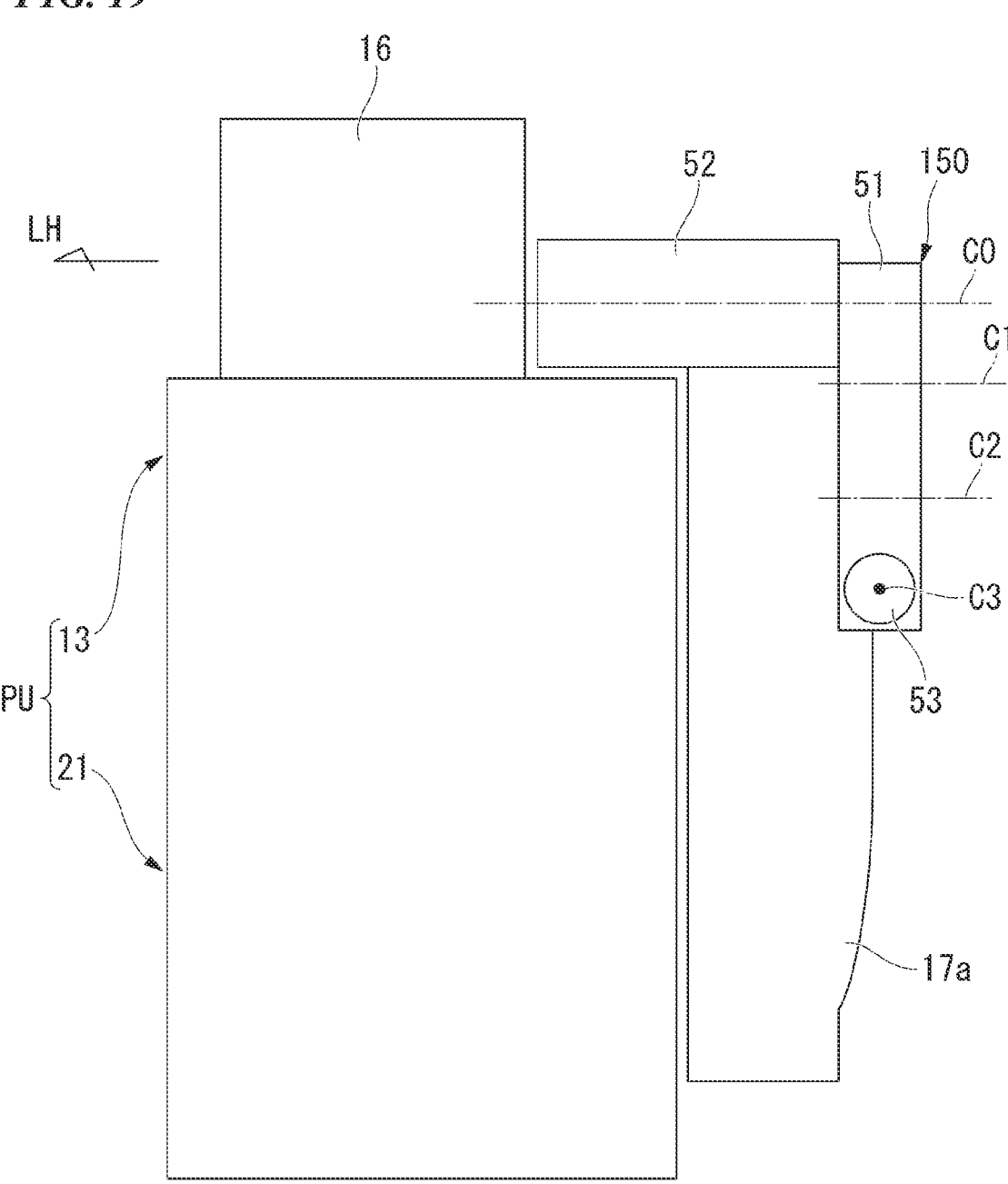
FIG. 19 is a view showing a vehicle mounting state of the clutch actuator of the modification example described above.

Here, with reference to FIG. 18 and FIG. 19, a modification example of the clutch actuator 50 will be described.

In the clutch actuator 50 of the embodiment described above, the axis direction of the axes of the motor 52 and the speed reduction mechanism 51 is arranged to be parallel to the axis direction of the release shaft 53. On the other hand, a clutch actuator 150 of the modification example of FIG. 18 and FIG. 19 is arranged such that the axis direction of the axes of the motor 52 and the speed reduction mechanism 51 is perpendicular to the axis direction of the release shaft 53. In the modification example, for example, a gear pair such as the second small diameter gear 58b and the driven gear 63a that are engaged with each other is constituted of gears (for example, a screw gear, a bevel gear, or the like) in which axis directions are perpendicular to each other.

In the clutch actuator 150 of the modification example, the axis direction of the axes of the motor 52 and the speed reduction mechanism 51 are arranged to be perpendicular to the axis direction of the release shaft 53. Further, the axis direction of the axes of the motor 52 and the speed reduction mechanism 51 is arranged to be parallel to the axis direction of the clutch apparatus 26. Thereby, even when a speed reduction gear having a large diameter for increasing a speed reduction ratio is provided on the speed reduction mechanism 51, specifically, it is possible to reduce the extension of the speed reduction mechanism 51 to the outside in the vehicle width direction while maintaining this speed reduction gear to be in a simple circular shape. Further, the motor 52 having a large axis direction size can be arranged to protrude in the vehicle width direction of the speed reduction mechanism 51 while avoiding the right cover 17a, the crankcase 15, and the like. That is, by using a side space or a rear space of the cylinder 16, it is possible to obtain an arrangement space for the motor 52 and to efficiently arrange the clutch actuator 150.

Thereby, it is possible to reduce the size of the clutch unit that is visible in a vehicle side view and improve the appearance. Further, it is possible to reduce the volume of the clutch unit that extends to a side portion of the engine 13 and reduce the impact on a vehicle body bank angle.

The present invention is not limited to the embodiment described above. For example, the clutch operator is not limited to a clutch lever and may be a clutch pedal or various other operators. The clutch apparatus is not limited to an apparatus that is arranged between the engine and the transmission and may be an apparatus that is arranged between a motor and an arbitrary output target other than the transmission. The motor is not limited to an internal combustion engine and may be an electric motor.

The present invention is not limited to the application to a saddle riding vehicle in which the clutch operation is automated as in the embodiment described above. For example, the present invention is also applicable to a saddle riding vehicle (a saddle riding vehicle that includes a transmission device that does not require a clutch operation) that is based on a manual clutch operation but is capable of changing the speed by adjusting the drive force without performing a manual clutch operation under a predetermined condition.

Further, the saddle riding vehicle includes all vehicles on which a driver rides by straddling the vehicle body and includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle. Further, a vehicle including an electric motor as the motor is also included.

The configuration in the embodiment described above is an example of the present invention, and various changes can be made without departing from the scope of the invention.

DESCRIPTION OF THE REFERENCE
SYMBOLS

1 Motorcycle (saddle riding vehicle)
13 Engine (motor)
17a Right cover (clutch-side member, cover member)
17 Cover recess portion (recess portion)
21 Transmission (output target)
26 Clutch apparatus
38 Release mechanism
40 ECU (control portion)
40A Clutch control apparatus
50, 150 Clutch actuator
50A Actuator unit
51 Speed reduction mechanism (transmission mechanism)
52 Motor (drive source)
53 Release shaft
54 Driven clutch lever (driven member)

58*a* Second reduction gear (fan gear)
59*a* Stopper
61 Upper shaft (operation-side shaft)
62 Lower shaft (clutch-side shaft)
63 Middle shaft (control-side shaft)
63*a* Driven gear (fan gear)

The invention claimed is:

1. A clutch control apparatus, comprising:

a clutch apparatus that connects and disconnects a power transmission between a motor and an output target;

a clutch actuator that outputs a drive force for operating the clutch apparatus;

a release mechanism that receives a drive force of the clutch actuator and operates the clutch apparatus, wherein the release mechanism comprises a release shaft that transmits the drive force of the clutch actuator to the clutch apparatus side, the release shaft is divided into: a clutch-side shaft that is supported by a clutch-side member as a separate body from the clutch actuator; and a control-side shaft that is supported by the clutch actuator and, during operation of the clutch control apparatus, is attachable to or detachable from the clutch-side shaft; and integral actuator unit that includes the control-side shaft.

2. The clutch control apparatus according to claim 1, wherein the clutch-side member is a cover member that covers the clutch apparatus, and a recess portion to which the actuator unit is attachable in a state where the actuator unit enters the recess portion is formed on the cover member.

3. The clutch control apparatus according to claim 1, comprising:

a control portion that drives and controls the clutch actuator, wherein the control portion enables intervention of a manual operation by a clutch operator in an automatic control of the clutch apparatus by a drive of the clutch actuator and shifts to a predetermined manual operation intervention control when there is intervention of the manual operation, the release shaft is divided into: an operation-side shaft to which a driven component that interlocks with the clutch operator is attached; the control-side shaft; and the clutch-side shaft, and the clutch actuator configures the actuator unit that includes the operation-side shaft and the control-side shaft.

4. The clutch control apparatus according to claim 3, wherein a transmission mechanism of the clutch actuator and a drive source are arranged at a forward position of the driven component.

5. The clutch control apparatus according to claim 3, wherein the control-side shaft is arranged to be spaced in an axis direction from the operation-side shaft and the clutch-side shaft.

6. The clutch control apparatus according to claim 1, wherein a transmission mechanism of the clutch actuator comprises a fan gear having a portion that is cut out in a circumferential direction.

7. The clutch control apparatus according to claim 1, wherein a transmission mechanism of the clutch actuator is a speed reduction mechanism that decelerates a drive force of a drive source in a step-by-step manner and transmits the drive force to the control-side shaft, and the speed reduction mechanism comprises: a driven gear that rotates integrally with the control-side shaft; and a stopper that defines a rotation reference position of a gear closer to the drive source than the driven gear in a deceleration path.

* * * * *